United States Patent
Fujikura et al.

(10) Patent No.: US 11,339,053 B2
(45) Date of Patent: May 24, 2022

(54) NITRIDE CRYSTAL

(71) Applicants: SCIOCS COMPANY LIMITED, Ibaraki (JP); SUMITOMO CHEMICAL COMPANY, LIMITED, Tokyo (JP)

(72) Inventors: Hajime Fujikura, Ibaraki (JP); Taichiro Konno, Ibaraki (JP); Takehiro Yoshida, Ibaraki (JP)

(73) Assignees: SCIOCS COMPANY LIMITED, Ibaraki (JP); SUMITOMO CHEMICAL COMPANY, LIMITED, Tokyo (JP)

(*) Notice: Subject to any disclaimer, the term of this patent is extended or adjusted under 35 U.S.C. 154(b) by 173 days.

(21) Appl. No.: 16/524,513

(22) Filed: Jul. 29, 2019

(65) Prior Publication Data

US 2020/0031668 A1 Jan. 30, 2020

(30) Foreign Application Priority Data

Jul. 30, 2018 (JP) .............................. JP2018-142906
Feb. 26, 2019 (JP) .............................. JP2019-032386

(51) Int. Cl.
*C01B 21/06* (2006.01)
*C30B 25/02* (2006.01)

(52) U.S. Cl.
CPC ...... *C01B 21/0632* (2013.01); *C01P 2006/40* (2013.01); *C01P 2006/80* (2013.01)

(58) Field of Classification Search
None
See application file for complete search history.

(56) References Cited

U.S. PATENT DOCUMENTS

| | | | | |
|---|---|---|---|---|
| 2003/0199171 | A1* | 10/2003 | Rice | H01L 21/326 438/710 |
| 2005/0011432 | A1 | 1/2005 | Kitaoka et al. | |
| 2007/0128753 | A1* | 6/2007 | Oshima | H01L 21/02458 438/46 |
| 2009/0081110 | A1* | 3/2009 | Shibata | H01L 21/0237 423/409 |
| 2012/0329245 | A1* | 12/2012 | Uematsu | H01L 21/02389 438/460 |
| 2013/0020649 | A1* | 1/2013 | Bae | H01L 27/0883 257/368 |

(Continued)

FOREIGN PATENT DOCUMENTS

| | | |
|---|---|---|
| JP | 2005-39248 A | 2/2005 |
| JP | 2007-153664 A | 6/2007 |

(Continued)

*Primary Examiner* — Sheng H Davis
(74) *Attorney, Agent, or Firm* — Pearne & Gordon LLP

(57) ABSTRACT

An object of the present invention is to improve quality of a nitride crystal, and also improve performance and manufacturing yield of a semiconductor device manufactured using the crystal. Provided is a nitride crystal in which a composition formula is represented by $In_xAl_yGa_{1-x-y}N$ (satisfying $0 \le x \le 1$, $0 \le y \le 1$, $0 \le x+y \le 1$), and the concentration of B in the crystal is less than $1\times10^{15}$ at/cm$^3$, and each of the concentrations of O and C in the crystal is less than $1\times10^{15}$ at/cm$^3$ in a region of 60% or more of a main surface.

12 Claims, 7 Drawing Sheets

Oxygen concentration: DL ~ 5 × 10$^{14}$ at/cm$^3$

| Sample No. | 8 | 9 | 10 | 11 |
|---|---|---|---|---|
| Baking temperature | 1100°C | 1400°C | 1500°C | 1600°C |
| Oxidizing sequence | Not conducted | Not conducted | Not conducted | Not conducted |
| Concentration of O (-20 mm from the center) | 3.2 × 10$^{17}$ | 5.2 × 10$^{16}$ | 4.4 × 10$^{15}$ | 1.2 × 10$^{15}$ |
| Concentration of O (-10 mm from the center) | 1.2 × 10$^{17}$ | 3.2 × 10$^{16}$ | 2.3 × 10$^{15}$ | 8.3 × 10$^{14}$ |
| Concentration of O (0 mm from the center) | 5.0 × 10$^{16}$ | 1.0 × 10$^{15}$ | 1.2 × 10$^{15}$ | 5.2 × 10$^{14}$ |
| Concentration of O (+10 mm from the center) | 1.0 × 10$^{17}$ | 2.4 × 10$^{16}$ | 1.8 × 10$^{15}$ | 5.5 × 10$^{14}$ |
| Concentration of O (+20 mm from the center) | 2.3 × 10$^{17}$ | 8.2 × 10$^{16}$ | 4.8 × 10$^{15}$ | 1.5 × 10$^{15}$ |
| Average concentration of O | 1.6 × 10$^{17}$ | 4.0 × 10$^{16}$ | 2.9 × 10$^{15}$ | 9.2 × 10$^{14}$ |
| Variation (%) | 82.3 | 90.0 | 62.1 | 53.3 |

(56) References Cited

U.S. PATENT DOCUMENTS

2015/0263220 A1* 9/2015 Yamane ................ H01L 33/32
  257/76
2019/0326111 A1 10/2019 Fujikura

FOREIGN PATENT DOCUMENTS

| JP | 2016-104693 A | 6/2016 |
| JP | 2018-70405 A | 5/2018 |

* cited by examiner

FIG. 6A

Oxygen concentration: DL = 5 × 10$^{14}$ at/cm$^3$

| Sample No. | 8 | 9 | 10 | 11 |
|---|---|---|---|---|
| Baking temperature | 1100°C | 1400°C | 1500°C | 1600°C |
| Oxidizing sequence | Not conducted | Not conducted | Not conducted | Not conducted |
| Concentration of O (−20 mm from the center) | 3.2 × 10$^{17}$ | 5.2 × 10$^{16}$ | 4.4 × 10$^{15}$ | 1.2 × 10$^{15}$ |
| Concentration of O (−10 mm from the center) | 1.2 × 10$^{17}$ | 3.2 × 10$^{16}$ | 2.3 × 10$^{15}$ | 8.3 × 10$^{14}$ |
| Concentration of O (0 mm from the center) | 5.0 × 10$^{16}$ | 1.0 × 10$^{16}$ | 1.2 × 10$^{15}$ | 5.2 × 10$^{14}$ |
| Concentration of O (+10 mm from the center) | 1.0 × 10$^{17}$ | 2.4 × 10$^{16}$ | 1.8 × 10$^{15}$ | 5.5 × 10$^{14}$ |
| Concentration of O (+20 mm from the center) | 2.3 × 10$^{17}$ | 8.2 × 10$^{16}$ | 4.8 × 10$^{15}$ | 1.5 × 10$^{15}$ |
| Average concentration of O | 1.6 × 10$^{17}$ | 4.0 × 10$^{16}$ | 2.9 × 10$^{15}$ | 9.2 × 10$^{14}$ |
| Variation (%) | 82.3 | 90.0 | 62.1 | 53.3 |

FIG. 6B

Carbon concentration: DL = 1 × 10$^{14}$ at/cm$^3$

| Sample No. | 8 | 9 | 10 | 11 |
|---|---|---|---|---|
| Baking temperature | 1100°C | 1400°C | 1500°C | 1600°C |
| Oxidizing sequence | Not conducted | Not conducted | Not conducted | Not conducted |
| Concentration of C (−20 mm from the center) | 2.2 × 10$^{17}$ | 3.2 × 10$^{16}$ | 4.4 × 10$^{15}$ | 1.8 × 10$^{15}$ |
| Concentration of C (−10 mm from the center) | 5.3 × 10$^{16}$ | 1.7 × 10$^{16}$ | 3.0 × 10$^{15}$ | 4.3 × 10$^{14}$ |
| Concentration of C (0 mm from the center) | 3.0 × 10$^{16}$ | 8.0 × 10$^{15}$ | 1.3 × 10$^{15}$ | 2.2 × 10$^{14}$ |
| Concentration of C (+10 mm from the center) | 6.3 × 10$^{16}$ | 2.3 × 10$^{16}$ | 2.3 × 10$^{15}$ | 7.7 × 10$^{14}$ |
| Concentration of C (+20 mm from the center) | 1.6 × 10$^{17}$ | 4.3 × 10$^{16}$ | 4.2 × 10$^{15}$ | 1.2 × 10$^{15}$ |
| Average concentration of C | 1.1 × 10$^{17}$ | 2.5 × 10$^{16}$ | 3.0 × 10$^{15}$ | 8.8 × 10$^{14}$ |
| Variation (%) | 90.3 | 71.1 | 51.0 | 89.4 |

FIG. 7A

Oxygen concentration: DL = 5 × 10$^{13}$ at/cm$^3$

| Sample No. | 12 | 13 | 14 | 15 | 16 |
|---|---|---|---|---|---|
| Baking temperature | 1100°C | 1400°C | 1500°C | 1550°C | 1600°C |
| Oxidizing sequence | Conducted | Conducted | Conducted | Conducted | Conducted |
| Concentration of O (-20 mm from the center) | 2.0 × 10$^{17}$ | 2.2 × 10$^{15}$ | DL | DL | DL |
| Concentration of O (-10 mm from the center) | 6.2 × 10$^{16}$ | 1.7 × 10$^{15}$ | 5.3 × 10$^{14}$ | DL | DL |
| Concentration of O (0 mm from the center) | 4.5 × 10$^{16}$ | 1.5 × 10$^{15}$ | 5.5 × 10$^{14}$ | DL | DL |
| Concentration of O (+10 mm from the center) | 9.0 × 10$^{16}$ | 1.8 × 10$^{15}$ | DL | DL | DL |
| Concentration of O (+20 mm from the center) | 1.8 × 10$^{17}$ | 1.9 × 10$^{15}$ | 6.0 × 10$^{14}$ | DL | DL |
| Average concentration of O | 1.2 × 10$^{17}$ | 1.8 × 10$^{15}$ | - | - | - |
| Variation (%) | 64.9 | 19.2 | - | - | - |

FIG. 7B

Carbon concentration: DL = 1 × 10$^{14}$ at/cm$^3$

| Sample No. | 12 | 13 | 14 | 15 | 16 |
|---|---|---|---|---|---|
| Baking temperature | 1100°C | 1400°C | 1500°C | 1550°C | 1600°C |
| Oxidizing sequence | Conducted | Conducted | Conducted | Conducted | Conducted |
| Concentration of C (-20 mm from the center) | 8.0 × 10$^{16}$ | 8.3 × 10$^{14}$ | 2.3 × 10$^{14}$ | DL | DL |
| Concentration of C (-10 mm from the center) | 5.5 × 10$^{16}$ | 9.0 × 10$^{14}$ | DL | DL | DL |
| Concentration of C (0 mm from the center) | 3.0 × 10$^{16}$ | 7.0 × 10$^{14}$ | 2.5 × 10$^{14}$ | DL | DL |
| Concentration of C (+10 mm from the center) | 4.2 × 10$^{16}$ | 6.5 × 10$^{14}$ | 2.4 × 10$^{14}$ | DL | DL |
| Concentration of C (+20 mm from the center) | 1.1 × 10$^{16}$ | 5.2 × 10$^{14}$ | 1.8 × 10$^{14}$ | DL | DL |
| Average concentration of C | 6.3 × 10$^{16}$ | 7.2 × 10$^{14}$ | - | - | - |
| Variation (%) | 63.1 | 26.4 | - | - | - |

NITRIDE CRYSTAL

BACKGROUND

Technical Field

The present invention relates to a nitride crystal.

Description of Related Art

In the case of manufacturing a semiconductor device such as a light emitting element or a high-speed transistor, for example, a crystal of group-III nitride such as gallium nitride (GaN) may be sometimes used (see, Patent Documents 1 to 4).

RELATED ART DOCUMENT

Patent Document

[Patent Document 1] Japanese Unexamined Patent Publication No. 2016-104693
[Patent Document 2] Japanese Unexamined Patent Publication No. 2007-153664
[Patent Document 3] Japanese Unexamined Patent Publication No. 2005-39248
[Patent Document 4] Japanese Unexamined Patent Publication No. 2018-070405

BRIEF SUMMARY OF THE INVENTION

Problems to be Solved by the Invention

An object of the present invention is to provide a technology that can improve quality of the above-described crystal, improve performance of a semiconductor device manufactured using the crystal, and achieve high yield manufacturing.

Means for Solving the Problem

According to an aspect of the present invention,
there is provided a nitride crystal,
wherein a composition formula is represented by $In_xAl_yGa_{1-x-y}N$ (satisfying $0 \leq x \leq 1$, $0 \leq y \leq 1$, $0 \leq x+y \leq 1$), and
a concentration of B in the crystal is less than $1 \times 10^{15}$ at/cm$^3$, and
each of the concentrations of O and C in the crystal is less than $1 \times 10^{15}$ at/cm$^3$ in a region of 60% or more of a main surface of the crystal.

Advantage of the Invention

According to the present invention, quality of a group-III nitride crystal can be improved, performance of a semiconductor device manufactured using the crystal can also be improved, and high yield manufacturing can be achieved.

BRIEF DESCRIPTION OF THE DRAWINGS

FIG. 6A is a diagram illustrating an evaluation result of in-plane distribution of an oxygen concentration in the GaN crystal when oxidizing sequence is not performed in a high temperature baking step, and FIG. 6B is a diagram illustrating an evaluation result of in-plane distribution of a carbon concentration in the GaN crystal when the oxidizing sequence is not performed in the high temperature baking step.

FIG. 7A is a diagram illustrating an evaluation result of in-plane distribution of the concentration of oxygen in the GaN crystal when oxidizing sequence is performed in a high temperature baking step, and FIG. 7B is a diagram illustrating an evaluation result of in-plane distribution of the concentration of carbon in the GaN crystal when oxidizing sequence is performed in a high temperature baking step.

DETAILED DESCRIPTION OF THE INVENTION

<Findings of the Inventors>

Figure 1A:
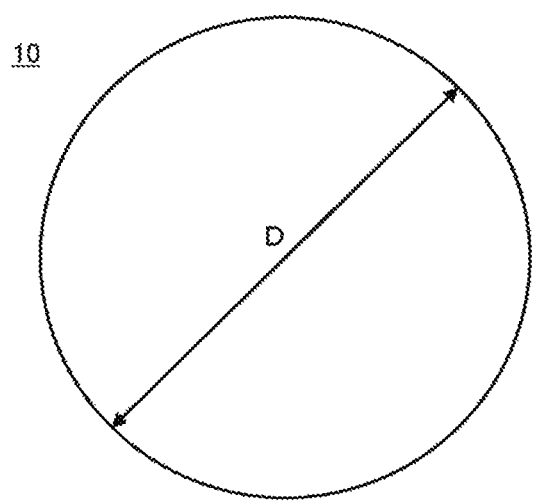
FIG. 1A is a plan view of a GaN-substrate 10.

The inventors of the present invention previously filed Japanese Patent Application No. 2016-210939. Japanese Unexamined Patent Publication of this application (Patent Document 4) discloses an extremely high purity group-III nitride crystal in which a composition formula is represented by $In_xAl_yGa_{1-x-y}N$ (satisfying $0 \leq x \leq 1$, $0 \leq y \leq 1$, $0 \leq x+y \leq 1$), and each of silicon (Si), boron (B), and iron (Fe) concentrations is less than $1 \times 10^{15}$ at/cm$^3$, and each of the concentrations of O and C is less than $5 \times 10^{15}$ at/cm$^3$ in the crystal, and a manufacturing method thereof.

Such a high purity crystal with extremely low concentrations of Si, B, Fe, O, and C is considered to be a novel crystal which has not been disclosed in the related art documents typified by Patent Documents 1 to 3. The study of the inventors of the present invention reveals that it is difficult to attain such a high purity crystal by a simple combination of crystal growth methods disclosed in Patent Documents 1 to 3, that is, a method of using a high purity gas as a source gas or a carrier gas and a method of coating an inner wall of a crystal growth furnace with a material such as AlN. The study of the inventors of the present invention also reveals that the above-described high purity crystal can be obtained for the first time by conducting at least a high temperature baking step disclosed in Patent Document 4 in a furnace before crystal growth and by optimizing various treatment conditions.

The concentration of impurities in the above-described high purity crystal is too low to be detected by SIMS (secondary ion mass spectrometry) which is a representative technique of analyzing impurities at the time of filing the present application. However, the inventors of the present invention conducted high-sensitivity SIMS measurement on this crystal using Raster change method attempting to find a room for further improvement of the crystal. Measurement result by the inventors of the present invention reveals that although the impurity concentration can be reduced as described above by performing the high temperature baking step, the concentration of O may reach, for example, 4.5× $10^{15}$ at/cm$^3$ or the concentration of C may reach, for example, 3.5×$10^{15}$ at/cm$^3$, depending on the treatment conditions in some cases. In addition, the inventors of the present invention reveal that an effect of reducing each of the concentrations of O and C is likely to be limited, for example, the effect can be obtained only in the vicinity of the center of a main surface of the substrate.

A new object of the present invention is to further reduce O and C incorporated in the crystal, and in order to solve the object, intensive study is performed by the inventors of the present invention. As a result, the inventors of the present invention found a new effect as follows: since an oxidizing sequence and an etching sequence are alternately repeated in the high temperature baking step, O and C incorporated in the crystal can be further reduced. In the oxidizing sequence, a small amount of an oxidizing agent such as oxygen ($O_2$) is added into a treatment atmosphere, and in the etching sequence, a predetermined amount of an etching gas such as hydrogen chloride (HCl) is added into the treatment atmosphere.

As a result of intensive study, the inventors of the present invention have found a new effect as follows: since the above-described method is used in the high temperature baking step, the effect of reducing the concentrations of O and C can be obtained in a region as wide as 60% or more of the main surface of the crystal. Specifically, it is found that since the high temperature baking step of alternately repeating the oxidizing sequence and the etching sequence is performed under a predetermined condition described later in a crystal growth furnace (reaction vessel) before growing the GaN crystal which is a basis of the GaN substrate, each of the concentrations of O and C in the GaN crystal can be reduced to less than 1×$10^{15}$ at/cm$^3$ in a region of 60% or more of the main surface of the GaN crystal. As described later, the above-described effect of reducing each of the concentrations of O and C is limited, for example, the effect can be obtained only in the vicinity of the center of the main surface of the crystal when the oxidizing sequence is not conducted in the above-described high temperature baking step.

In addition, as a result of intensive study, the inventors of the present invention have also found as follows: since the impurity concentration in the GaN crystal is reduced as described above, the GaN substrate can have a great hardness that cannot be obtained in a conventional GaN crystal.

Further, as a result of intensive study, the inventors of the present invention have found a new effect as follows: since the above-described method is used in the high temperature baking step, the effect of having a great hardness of the GaN substrate can be obtained in a region as wide as 60% or more of the main surface of the crystal. Specifically, the inventors found as follows: since the high temperature baking step of alternately repeating the oxidizing sequence and the etching sequence is performed under a predetermined condition described later in the reaction vessel when growing the GaN crystal that is the basis of the GaN substrate, the GaN substrate can have a hardness of exceeding 22.0 GPa in the region of 60% or more of the main surface, the hardness being measured by a nano-indentation method using an indenter with a maximum load applied thereto being within a range of 1 mN or more and 50 mN or less.

The phrase "a crystal has a great hardness" means "the crystal is hard to deform". When an ingot of the GaN-crystal is processed to fabricate a substrate, there is a freshly generated stress derived from a processing jig such as a slicer or a surface polishing plate, in addition to originally existing residual stress in the inside of the crystal. A hardness of the crystal which is smaller relative to the combined stress of them facilitates occurrence of slip motion in the dislocation originally existing in the crystal, occurrence of fresh dislocation in the crystal, or occurrence of further slip motion in the increased dislocation. As the result, the crystal will be plastically deformed. Further, upon progress of such plastic deformation, the crystal easily displays shattered cracks (cracks) or is easily broken. Such a problem may similarly occur not only during fabricating a substrate, but also during fabricating a semiconductor device from the substrate, for example, when performing a dicing process.

The crystal according to the present invention has an excellent advantage of hardly accompanied by the above-described problem since it has a great hardness that cannot be obtained in the conventional GaN-crystal. A hardness of a crystal can be measured using a known method such as Vickers test or a nanoindentation method. Among them, a nanoindentation method using an indenter having small tip diameter is advantageous in that a measurement result stable in terms of a hardness can be obtained.

The inventors of the present invention attained a crystal according to the present application exemplified by the following aspects for the first time based on their findings.

First Embodiment of the Present Invention (1) Constitution of GaN-substrate

Figure 1B:
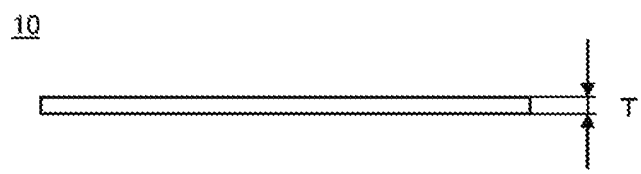
FIG. 1B is a side view of the GaN-substrate 10.

A crystal in this embodiment is constituted, as an example, as a planar (disc) substrate (wafer) 10 containing a single crystal of GaN (hereinafter also referred to as GaN-crystal, or GaN-single crystal). FIG. 1A and FIG. 1B show a plan view and a side view of the substrate 10, respectively. The substrate 10 is suitably used for fabricating a semiconductor device such as a laser diode, an LED, and a high speed transistor, and preferably has a diameter D of 25 mm or more, such as 2 inches (5.08 cm) since the substrate having a diameter D of less than 25 mm tends to result in reduced productivity of the semiconductor device. Preferably the substrate has a thickness T of 250 μm or more, since the substrate 10 having a thickness T of less than 250 μm has a low mechanical strength and is more susceptible to cracking of the substrate in a device structure using the substrate during crystal growth or subsequent device processing, thus making it difficult to maintain a free-standing state. The dimensions described herein is just an example, and this embodiment is not limited thereto.

The substrate 10 is obtained by epitaxially growing a GaN-single crystal on a seed crystal substrate containing a GaN-single crystal, using a hydride vapor phase epitaxy method (referred to as a HVPE method hereafter), and slicing and making this thick grown crystal ingot self-standing. Alternatively, the substrate 10 may also be obtained by using a GaN layer on the heterogeneous substrate as an underlayer as described in Patent Document 2, and making the GaN layer grow thicker through a nano mask, peeling the resultant from the heterogeneous substrate, and removing a facet-grown crystal on the heterogeneous substrate side.

The substrate 10 in this embodiment is constituted as a semi-insulating substrate having a relatively higher insulation property, that is, having a relatively greater electric resistivity. As the electric resistivity of the GaN-crystal constituting the substrate 10, magnitude of 1×$10^6$ Ωcm or more is maintained, for example, under a temperature condition of 20° C. or more and 300° C. or less, and magnitude of 1×$10^5$ Ωcm or more is maintained under a temperature condition of exceeding 300° C. and 400° C. or less. For example, magnitude of about $1\times10^{10}$ Ωcm is shown as the upper limit of the electric resistivity of the GaN-crystal, although it is not particularly limited. Such a high electric resistivity of the GaN-crystal in this embodiment is attributable to extremely low concentrations of various impurities contained in the crystal, specifically, each of the concentrations of silicon (Si), boron (B), iron (Fe), oxygen (O), and carbon (C) being less than $1\times10^{15}$ at/cm³. All of the impurity concentrations are less than a lower limit of measurement (lower limit of detection) of a currently available representative SIMS analysis. Further, the concentrations of O and C are too low to be specifically identified even when SIMS analysis is conducted using Raster change method which is known for its high sensitivity. The Raster change method is a method in which, for example, area to be subjected to Raster-scanning is changed in the course of analysis for depth profile using SIMS to distinguish a level of an element contained in a sample from a background level derived from a SIMS apparatus, thereby obtaining a net concentration of the element contained in the sample at high accuracy.

Each of the concentrations of O and C in the GaN crystal described above is less than $1\times10^{15}$ at/cm³ in a region of 60% or more, and in a region of 70% or more of the main surface of the crystal, that is, the main surface of the substrate 10 depending on the case. Each of the concentrations of O and C in the crystal may be less than $5\times10^{14}$ at/cm³ in a region of 60% or more, and in a region of 70% or more of the main surface of the substrate 10 depending on the case. The concentrations of C in the crystal may be less than $1\times10^{14}$ at/cm³ in a region of 60% or more, and in a region of 70% or more of the main surface of the substrate 10 depending on the case.

A hardness of the GaN-crystal included in the substrate 10 exceeds 22 GPa as measured by a nanoindentation method using an indenter with a maximum load applied thereto being within a range of 1 mN or more and 50 mN or less. Such a hardness is a great hardness that cannot be obtained in a conventional GaN crystal. It is considered that such a hardness can be attained since the impurity concentration in the crystal is extremely low, specifically, each of the concentrations of B, Fe, O, and C being less than $1\times10^{15}$ at/cm³. Note that measurement of a hardness by a nanoindentation method herein was conducted using a method described in W. C. Oliver and G. M. Pharr, J. Mater. Res. 7, 1564 (1992).

A hardness of the GaN-crystal included in the substrate 10 exceeds 22.0 GPa in a region of 60% or more, and in a region of 70% or more of the main surface of the crystal, that is, the main surface of the substrate 10 depending on the case, as measured by a nanoindentation method using an indenter with a maximum load applied thereto being within a range of 1 mN or more and 50 mN or less. The above-described hardness may sometimes exceed 22.5 GPa and even exceed 23.2 GPa in a region of 60% or more of the main surface of the substrate 10. It is considered that an in-plane distribution of the hardness described herein is due to having an effect of reducing the concentrations of O and C obtained widely in a region of 60% or more of the main surface of the substrate 10, as described above.

The GaN-crystal in this embodiment has not been grown with a flux method using alkaline metal such as sodium (Na) or lithium (Li) as a flux but grown with HVPE method as described later. Therefore, the GaN-crystal in this embodiment contains substantially no alkaline metal element such as Na or Li. It should be noted that according to SIMS measurement (analysis in the direction of depth) on impurity elements other than Si, B, Fe, O, and C conducted by the inventors of the present invention, none of the elements of arsenic (As), chlorine (Cl), phosphorus (P), fluorine (F), Na, Li, potassium (K), tin (Sn), titanium (Ti), manganese (Mn), chromium (Cr), molybdenum (Mo), tungsten (W), and nickel (Ni) is detected in the GaN-crystal in this embodiment, in other words, the concentrations of these impurities are less than the lower limit of detection. The lower limit of detection of each element in the SIMS measurement at present is as follows:

As: $5\times10^{12}$ at/cm³, Cl: $1\times10^{14}$ at/cm³, P: $2\times10^{15}$ at/cm³, F: $4\times10^{13}$ at/cm³, Na: $5\times10^{11}$ at/cm³, Li: $5\times10^{11}$ at/cm³, K: $2\times10^{12}$ at/cm³, Sn: $1\times10^{13}$ at/cm³, Ti: $1\times10^{12}$ at/cm³, Mn: $5\times10^{12}$ at/cm³, Cr: $7\times10^{13}$ at/cm³, Mo: $1\times10^{15}$ at/cm³, W: $3\times10^{16}$ at/cm³, Ni: $1\times10^{14}$ at/cm³.

After intensive study by the inventors of the present invention, it is found to be difficult to attain such an extremely low impurity concentration as described above by a conventional crystal growth method, for example, methods disclosed in Patent Documents 1 to 3.

Patent Document 1 discloses that there is a method of suppressing incorporation of O and Si into a GaN crystal wherein a gas containing O and Si is not used as a source gas or a carrier gas and an inner wall of a vessel for crystal growth is coated with a material free from both O and Si. In addition, it also discloses that there is a method of suppressing incorporation of C into a GaN-crystal wherein a member made of carbon is not used as an inner-furnace member and a C-containing gas is not used as a source gas or a carrier gas.

Patent Document 2 discloses that a combination of the following techniques enables reduction of the concentration of impurities contained in the GaN-crystal: to bring a source gas or a carrier gas into contact with a Ga melt for a long period of time to let the Ga melt capture impurities contained in the gas in HVPE method; to pre-form a metal nano mask on a seed crystal substrate, the metal nano mask including a plurality of micropores having ability to capture impurities; and to shorten a growth period in the facet-plane state where impurities are easily incorporated to precociously shift toward a growth on a plane where impurities are hardly incorporated.

Patent Document 3 discloses a method of using a high purity gas as a source gas or a carrier gas and a method of coating a surface of an inner-furnace member with a material such as AlN or the like. It also discloses that coating the surface of the inner-furnace member results in reduced incorporation of Si and O into the GaN-crystal.

However, these documents do not attain the above-described high purity crystal in which all of Si, B, Fe, O, and C exist in extremely low concentration. As is obvious from comparison of samples 8, 12, and 17 with other samples explained in Examples described later, it is difficult to obtain a high purity crystal in which all of Si, B, Fe, O, and C exist in extremely low concentration by simply combining the methods described in these documents. As is obvious from comparison of these samples, it is required at least to conduct a high temperature baking step in a furnace before a crystal growth step and to appropriately select the treatment condition, in order to attain a high purity crystal wherein each of the concentrations of Si, B, and F is less than $1\times10^{15}$ at/cm³ and each of the concentrations of O and C is less than $5\times10^{15}$ at/cm³.

Further, in order to obtain a crystal in which each of the concentrations of O and C as well as Si, B, and Fe is less than $1\times10^{15}$ at/cm³, and further in order to widely obtain an effect of reducing the concentrations of O and C in a region of 60% or more of the main surface of the crystal, the above-described high temperature baking step disclosed in the above-described Patent Document 4 is insufficient and therefore should be further improved. Specifically, an oxidizing sequence and an etching sequence are required to be alternately and repeatedly performed in the high temperature baking step under the predetermined condition. Procedures and treatment conditions therefor will be hereinafter explained in detail.

(2) GaN-Substrate Manufacturing Method

A manufacturing method of the substrate 10 in this embodiment will be specifically explained hereinafter.

First, a constitution of an HVPE apparatus 200 used for growing the GaN-crystal will be explained in detail, with reference to FIG. 2. The HVPE apparatus 200 includes a reaction vessel 203 formed into a cylindrical shape, for example. The reaction vessel 203 has a sealed structure so as not to allow entrance of atmospheric air outside thereof or a gas contained in a glove box 220 described later. In the reaction vessel 203, a reaction chamber 201 is formed in which the crystal growth is conducted. In the reaction chamber 201, a susceptor 208 is provided which retains a seed crystal substrate 20 comprising a GaN-single crystal. The susceptor 208 is connected to a rotary axis 215 of a rotary mechanism 216, and thus rotatably constituted. In addition, the susceptor 208 includes an internal heater 210. The internal heater 210 is constituted so that its temperature can be controlled separately from the temperature of a zone heater 207 described later. Moreover, the upstream side and the periphery of the susceptor 208 are covered with a heat shield wall 211. Since the heat shield wall 211 is provided, a gas other than the gas supplied from nozzles 249a to 249c described later will not be supplied to the seed crystal substrate 20.

Figure 3:
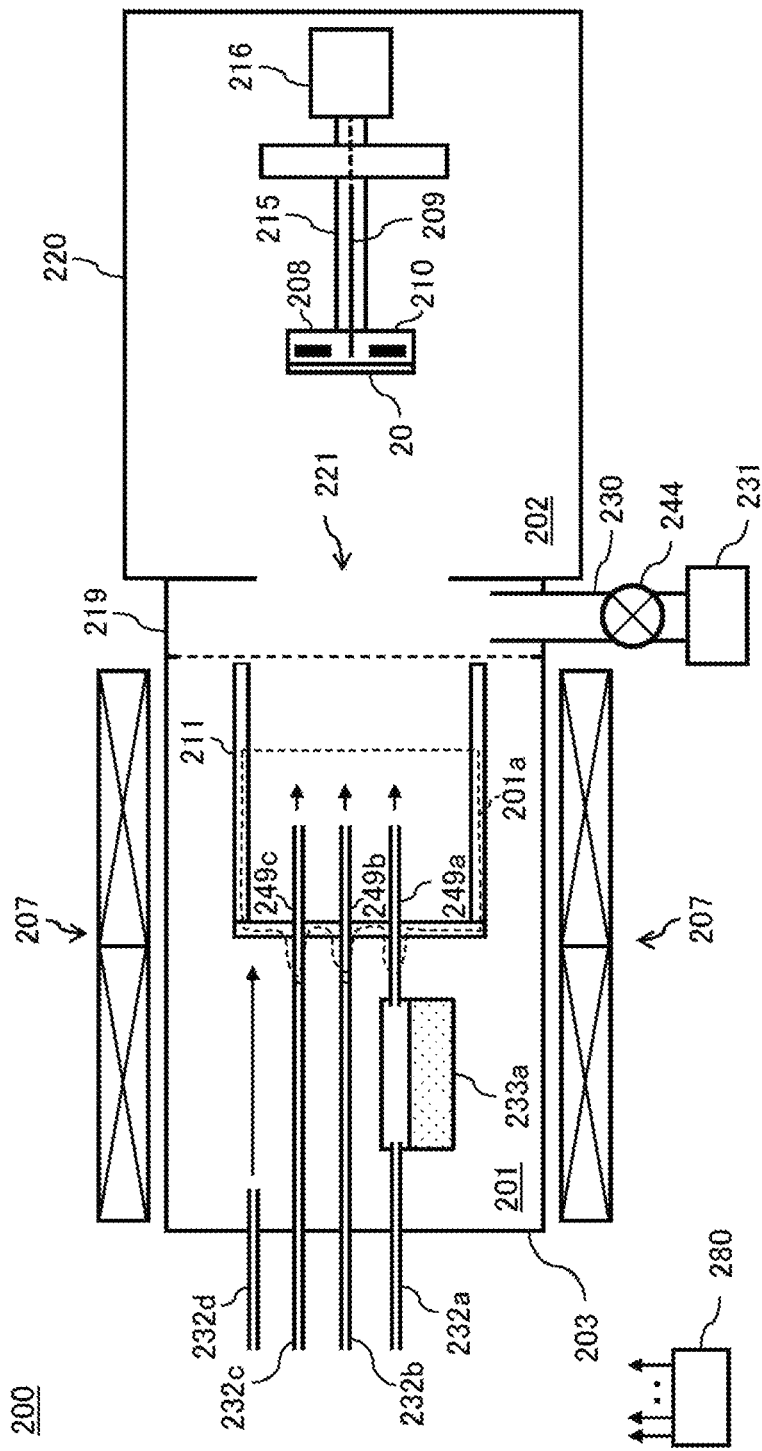
FIG. 3 is a schematic block diagram of the vapor phase growth apparatus 200, illustrating a state where a furnace port 221 of a reaction vessel 203 is opened.

The reaction vessel 203 is connected to the glove box 220 through a cylindrical metal flange 219 comprising SUS or the like. The glove box 220 is also has an air-tight structure so as not to let the atmospheric air be incorporated therein. An exchanging chamber 202 provided in the glove box 220 is continuously purged with high purity nitrogen (hereinafter also simply referred to as $N_2$ gas), and thus the concentrations of oxygen and water are maintained at low values. The glove box 220 includes a transparent acrylic wall, a plurality of rubber gloves connected to holes penetrating the wall, and a pass box to put an object in and out of the glove box 220. The pass box includes an evacuation mechanism and a $N_2$ purge mechanism, in which the atmospheric air is replaced with $N_2$ gas so that an object can be put in and out of the glove box 220 without letting the atmospheric air containing oxygen be incorporated in the glove box 220. As shown in FIG. 3, the crystal substrate is put in and out of the reaction vessel 203, while the port of the metal flange 219, that is, the furnace port 221 is opened. In this way, re-contamination of the surface of each member in the reaction vessel 203 and adherence of the atmospheric air and the gas containing various impurities described above to the surface of the member may be prevented, the member being after completion of cleaning and modification through a high temperature baking step described later. Impurities referred herein contain at least any one of $O_2$ and moisture ($H_2O$) derived from atmospheric air; organics containing C, O, and hydrogen (H), Na, and K derived from human body or the like; As, Cl, P, and F derived from a gas used in a crystal growth step or a device manufacturing step; Fe, Sn, Ti, Mn, Cr, Mo, W, and Ni derived from metallic member inside the furnace; and the like.

The reaction vessel 203 includes, at its one end, a gas supply pipe 232a for supplying HCl gas into a gas generator 233a described later, a gas supply pipe 232b for supplying ammonia ($NH_3$) gas into the reaction chamber 201, a gas supply pipe 232c for supplying HCl gas for high temperature baking and normal baking into the reaction chamber 201, and a gas supply pipe 232d for supplying nitrogen ($N_2$) gas into the reaction chamber 201, respectively. The gas supply pipes 232a to 232c are also constituted so as to be able to supply hydrogen ($H_2$) gas and Na gas as carrier gases in addition to HCl gas and $NH_3$ gas. The gas supply pipes 232a to 232c are also constituted so as to be able to supply a trace amount of oxygen ($O_2$) gas in addition to these gases. The gas supply pipes 232a to 232c include a flow rate controller and a valve (both not shown) for each type of these gases, so as to conduct flow rate control and supply/stop of various gases individually for each type of gas. In addition, the gas supply pipe 232d also includes a flow rate controller and a valve (both not shown). Na gas supplied from the gas supply pipe 232d is used to purge the upstream side and the periphery of the heat shield wall 211 in the reaction chamber 201 to maintain cleanliness of the atmosphere of these portions.

HCl gas supplied from the gas supply pipe 232c and $H_2$ gas supplied from the gas supply pipes 232a to 232c serve as cleaning gases for cleaning the surface of the members in the reaction chamber 201 (particularly, the inside of the heat shield wall 211) in an etching sequence of a high temperature baking step described later and an normal baking step and also serve as modification gases for modifying the surface to a surface with less possibility to release impurities. A trace amount of $O_2$ gas supplied from the gas supply pipes 232a to 232c serves as a gas which promotes the above-described cleaning and modification in an oxidizing sequence in the high temperature baking step described later. The mechanism of such promotion is unknown, but it is considered that since a trace amount of $O_2$ gas is added into an atmosphere in the high temperature baking step described later, organics attached to the inner-furnace member react with the $O_2$ gas to generate volatiles such as $H_2O$ and $CO_2$, thereby the attached organics becoming easily detached. $N_2$ gas supplied from the gas supply pipes 232a to 232c serves to appropriately regulate a blowout flow velocity of HCl gas, $H_2$ gas and $O_2$ gas being ejected from the tip of the nozzles 249a to 249c so that a desired portion of the reaction chamber 201 (particularly, the inside of the heat shield wall 211) is appropriately cleaned in each baking step.

HCl gas introduced from the gas supply pipe 232a serves as a reactant gas that reacts with a Ga-source to produce GaCl gas which is a halide of Ga, that is, a Ga source gas, in a crystal growth step described later. Further, $NH_3$ gas supplied from the gas supply pipe 232b serves as a nitriding agent which reacts with GaCl gas to grow GaN, a nitride of Ga, on the seed crystal substrate 20, that is, as an N source gas, in the crystal growth step described later. Hereinafter, GaCl gas and $NH_3$ gas may be collectively referred to as a source gas. $H_2$ gas and $N_2$ gas supplied from the gas supply pipes 232a to 232c serve to appropriately regulate the blowout flow velocity of the source gas which is ejected from the tips of the nozzles 249a to 249c to direct the source gas toward the seed crystal substrate 20, in the crystal growth step described below.

On the downstream side of the gas supply pipe 232a, as described above, the gas generator 233a which contains the Ga melt as a Ga-source is provided. The gas generator 233a is provided with a nozzle 249a which supplies GaCl gas produced by the reaction between HCl gas and the Ga melt to a main surface of the seed crystal substrate 20 retained on the susceptor 208. On the downstream side of the gas supply pipes 232b, 232c, nozzles 249b, 249c are provided, which supply various gases supplied from these gas supply pipes toward the main surface of the seed crystal substrate 20 retained on the susceptor 208. Each of the nozzles 249a to 249c is constituted so as to penetrate the upstream side of the heat shield wall 211.

The gas supply pipe 232c is constituted to be able to supply, in addition to HCl gas, $H_2$ gas, and $N_2$ gas, a Fe-containing gas such as ferrocene ($Fe(C_5H_5)_2$, abbreviated as $Cp_2Fe$) gas or iron (III) trichloride ($FeCl_3$) gas, a Si-containing gas such as silane ($SiH_4$) gas or dichlorosilane ($SiH_2Cl_2$) gas, or a Mg-containing gas such as bis(cyclopentadienyl)magnesium ($Mg(C_5H_5)_2$, abbreviated as $Cp_2Mg$) gas, as a dopant gas.

The metal flange 219 provided on the other end of the reaction vessel 203 is provided with an exhaust pipe 230 for exhausting the reaction chamber 201. The exhaust pipe 230 includes an APC valve 244 as a pressure regulator and a pump 231, in this order from upstream side. Instead of the APC valve 244 and the pump 231, a blower including a pressure regulation mechanism may be used.

The outer circumference of the reaction vessel 203 is provided with a zone heater 207 which heats the inside of the reaction chamber 201 to a desired temperature. The zone heater 207 includes at least two heaters, one for an upstream side portion surrounding the gas generator 233a and one for a downstream side portion surrounding the susceptor 208, each heater having a temperature sensor and a temperature regulator (both not shown) so as to enable individual regulation of temperature within a range from a room temperature to 1200° C.

As described above, the susceptor 208 retaining the seed crystal substrate 20 includes the internal heater 210, a temperature sensor 209, and a temperature regulator (not shown) separately from the zone heater 207, so as to enable temperature regulation at least in a range from room temperature to 1600° C. In addition, the upstream side and the periphery of the susceptor 208 are, as described above, enclosed by the heat shield wall 211. Regarding the heat shield wall 211, it is necessary to use a limited member for at least a surface (inner circumference surface) facing the susceptor 208 so as not to generate impurities, as described later. However, there is no limitation to the member to be used for the surface other than the inner circumference surface (outer circumference surface) so long as it is resistant to a temperature of 1600° C. or more. In the heat insulation wall 211, at least a portion excluding the inner circumference surface may include, for example, a highly thermal resistant, non-metallic material such as carbon or silicon carbide (SiC) or tantalum carbide (TaC), or a highly thermal resistant, metallic material such as Mo or W, and may be designed as a constitution including laminated plate-like reflectors. Using this constitution, the temperature of the outside of the heat shield wall 211 may be suppressed to 1200° C. or less even when the temperature of the susceptor 208 is 1600° C. Quartz may be used for each member constituting the upstream side portion such as the reaction vessel 203, the gas generator 233a, and the gas supply pipes 232a to 232d in this constitution, since this temperature is equal to or less than a softening point of quartz.

In the reaction chamber 201, surfaces of members which form a region heated to 900° C. or more during the crystal growth step described later, which is a region (high-temperature reaction region) 201a possibly contacted with the gas supplied to the seed crystal substrate 20, contain a material having heat resistance to at least 1600° C. or more and not containing quartz ($SiO_2$) and B. Specifically, surfaces of an inside wall of a portion of the heat shield wall 211 located on the upstream side of the susceptor 208, internally penetrating portions of the nozzles 249a to 249c penetrating through the heat shield wall 211, a portion outside of the heat shield wall 211 which is to be heated to 900° C. or more in the crystal growth step, the susceptor 208, and the like may contain a heat resistant material such as alumina ($Al_2O_3$), SiC, graphite, TaC, or pyrolytic graphite. It goes without saying that the portion surrounding the internal heater 210, which is not included in the region 201a, is also required to have high heat resistance to at least 1600° C. or more. The reason why the members forming the region 201a or the like are required to have such a high heat resistance is because the high temperature baking step is conducted before conducting the crystal growth step as described later.

Members included in the HVPE apparatus 200, such as various valves and a flow rate controllers included in the gas supply pipes 232a to 232d, the pump 231, the APC valve 244, the zone heater 207, the internal heater 210, and the temperature sensor 209 are respectively connected to a controller 280 constituted as a computer.

Next, an example of the treatment for epitaxially growing the GaN-single crystal on the seed crystal substrate 20 using the above-described HVPE apparatus 200 will be explained in detail with reference to FIG. 2. In the following explanation, the operation of each part constituting the HVPE apparatus 200 is controlled by the controller 280.
(High Temperature Baking Step)

This step is conducted when the inside of the reaction chamber 201 and the inside of the exchanging chamber 202 are exposed to the atmospheric air, since maintenance of the HVPE apparatus 200 or loading of the Ga-source into the gas generator 233a is performed. Before performing this step, it should be confirmed that air tightness of the reaction chamber 201 and the exchanging chamber 202 is secured. After the air tightness is confirmed, the inside of the reaction chamber 201 and the inside of the exchanging chamber 202 are respectively replaced with $N_2$ gas. Thereafter, the surfaces of various members constituting the reaction chamber 201 are subjected to heat treatment while the inside of the reaction vessel 203 is in a predetermined atmosphere. The treatment is conducted while the seed crystal substrate 20 is not loaded into the reaction vessel 203, and Ga-source is loaded into the gas generator 233a.

In this step, the temperature of the zone heater 207 is regulated to the temperature similar to the temperature in the crystal growth step. Specifically, the temperature of an upstream-side heater surrounding the gas generator 233a is set to a temperature from 700 to 900° C., while a downstream-side heater surrounding the susceptor 208 is set to a temperature from 1000 to 1200° C. Further, the temperature of the internal heater 210 is set to a predetermined temperature of 1500° C. or more. As described later, in the crystal growth process, since the internal heater 210 is off or set to the temperature of 1200° C. or less, the temperature of the high temperature reaction region 201a becomes 900° C. or more and less than 1200° C. On the other hand, in the high temperature baking step, since the temperature of the internal heater 210 is set to the temperature of 1500° C. or more, the temperature of the high temperature reaction region 201a becomes 1000 to 1500° C. or more, the temperature in the neighborhood of the susceptor 208 on which the seed crystal substrate 20 is mounted becomes as high as 1500° C. or more, and, as for other location, the temperature at each location becomes at least 100° C. or more higher than the temperature during the crystal growth step. The portion in the high temperature reaction region 201a, where the temperature is 900° C. which is lowest during conducting the crystal growth step, specifically the portion upstream of the nozzles 249a to 249c the inside of the heat shield wall 211, is the portion where an adhered impurity gas is most difficult to remove. Since the temperature of the internal heater 210 is set to 1500° C. or more so that the temperature at this site becomes at least 1000° C. or more, the effect of cleaning and modification treatment described later, that is, the effect of reducing impurities in the GaN-crystal to be grown can be sufficiently attained. When the temperature of the internal heater 210 is set to a temperature of less than 1500° C., the temperature at any point in the high temperature reaction region 201a cannot be sufficiently raised, and thus the effect of cleaning and modification treatment described later, that is, the effect of reducing impurities in the GaN-crystal can be hardly attained.

The upper limit of the temperature of the internal heater 210 in this step depends on the ability of the heat shield wall 211. So long as the temperature of the quartz parts and the like on the outside of the heat shield wall 211 can be suppressed within a range not exceeding their heat resistant temperature, the higher the temperature of the internal heater 210, the more easily the effect of cleaning and modification treatment in the reaction chamber 201 can be obtained. When the temperature of the quartz parts on the outside of the heat shield wall 211 exceeds their heat resistant temperature, maintenance frequency and the cost of the HVPE apparatus 200 are increased in some cases.

Further, in this step, after the temperatures of the zone heater 207 and the internal heater 210 have reached the above-described predetermined temperatures, $H_2$ gas is supplied from each of the gas supply pipes 232a, 232b, for example, at a flow rate of about 3 to 5 slm. Moreover, a sequence (oxidizing sequence) supplying $N_2$ gas, for example, at a flow rate of about 3 to 5 slm along with $O_2$ gas, for example, at a flow rate of about 0.005 to 0.25 slm, and a sequence (etching sequence) supplying HCl gas, for example, at a flow rate of about 0.3 to 4 slm along with $H_2$ gas, for example, at a flow rate of about 1 to 5 slm, from a gas supply pipe 232c, are alternately repeated. In addition, $N_2$ gas is supplied from the gas supply pipe 232d, for example, at a flow rate of about 10 slm. Each period for conducting the etching sequence and the oxidizing sequence is preferably about 1 to 15 minutes. In this step, baking is conducted in the reaction chamber 201 while a cycle of alternately performing these sequences is repeated for a predetermined number of times. In the repeated cycles, the sequence to be conducted at the end is preferably an etching sequence. Since the supply of $H_2$ gas, HCl gas, and $O_2$ gas is started at the above-described timing, that is, after a temperature in the reaction chamber 201 is raised, an amount of a gas which flows out wastefully without contributing to the cleaning and modification treatment described later can be reduced, and a cost for the treatment of the crystal growth can be reduced.

Further, since this step is conducted while operating the pump 231, and at this time, an opening degree of the APC valve 244 is regulated, the pressure in the reaction vessel 203 is maintained, for example, at a pressure of 0.5 atm or more and 2 atm or less. Also, since this step is performed while exhausting the reaction vessel 203, removal of the impurities from the reaction vessel 203, that is, cleaning of inside of the reaction vessel 203 can be efficiently performed. When the pressure in the reaction vessel 203 is less than 0.5 atm, it becomes difficult to attain the effect of cleaning and modification treatment described later. In addition, when the pressure in the reaction vessel 203 exceeds 2 atm, the members in the reaction chamber 201 will receive excessive etching damage.

Further, in etching sequence in this step, a partial pressure ratio of HCl gas to $H_2$ gas (HCl partial pressure/$H_2$ partial pressure) in the reaction vessel 203 is, for example, set to 1/50 to 1/2. When the above-described partial pressure ratio is smaller than 1/50, it becomes difficult to attain the effect of cleaning and modification treatment in the reaction vessel 203. In addition, when the partial pressure ratio exceeds 1/2, the members in the reaction chamber 201 will receive excessive etching damage.

Further, in oxidizing sequence in this step, a partial pressure ratio of $O_2$ gas to $H_2$ gas and $N_2$ gas ($O_2$ partial pressure/$H_2$+$N_2$ partial pressure) in the reaction vessel 203 is, for example, set to $1/10^3$ to $50/10^3$. Namely, a flow rate of $O_2$ gas to be supplied into the reaction vessel 203 is set to be within a range of 0.1 to 5% of the total flow rate of other gases ($H_2$ gas, $N_2$ gas) to be supplied into the reaction vessel 203. When the partial pressure ratio is smaller than $1/10^3$, it becomes difficult to attain the effect of both promoting cleaning and promoting modification treatment in the reaction vessel 203. Further, when the above-described partial pressure ratio exceeds $50/10^3$, for example, O components remaining in the reaction vessel 203 in a crystal growth step described later will increase, which may result in increased concentration of O in the GaN-crystal to be grown on the seed crystal substrate 20.

The partial pressure can be controlled by regulating the flow rate of the flow rate controller provided to the gas supply pipes 232a to 232c.

In this step, when each of the oxidizing sequence and etching sequences is conducted for one minute, an alternate oxidizing-and-etching cycle shall be performed 20 times or more. Alternatively, when each of the oxidizing sequence and the etching sequences is conducted for 15 minutes, an alternate oxidizing-and-etching cycle shall be conducted twice or more. As a result, the surfaces of the various members forming at least the high temperature reaction region 201a in the reaction chamber 201 can be cleaned and the foreign materials adhering to the surfaces can be removed. Then, since the surfaces of these members are maintained at the temperature 100° C. or more higher than the temperature in the crystal growth step described later, release of the impurity gas from these surfaces can be promoted and these surfaces can be modified to the surfaces where the release of impurities such as Si, B, Fe, O, and C hardly occurs (to the surface where an outgas hardly occurs) under the temperature and pressure conditions in the crystal growth step. In this step, the total period for conducting the oxidizing sequence and the etching sequence is preferably 30 minutes or more, more preferably 60 minutes or more, and still more preferably 120 minutes or more. Further, the cycle is repeated preferably twice or more, more preferably 4 times or more, and still more preferably 8 times or more. When the time for conducting the respective sequences becomes less than 30 minutes in total or when the repetition time of the cycle is less than twice, the effect of cleaning and modification treatment described herein becomes insufficient in some cases. In addition, when the time for conducting this step exceeds 300 minutes in total, the members which form the reaction region 201a will receive excessive damage.

When $H_2$ and HCl gas are supplied into a reaction vessel 203, the supply of $NH_3$ gas into the reaction vessel 203 is not conducted. In this step, when $NH_3$ gas is supplied into the reaction vessel 203, it becomes more difficult to obtain the effect of the above-described cleaning and modification treatment, particularly the effect of the modification treatment.

Further, when $H_2$ gas and HCl gas are supplied into the reaction vessel 203, chlorine ($Cl_2$) gas may be supplied in place of HCl gas. In this case, the effect of the above-described cleaning and modification treatment can be similarly obtained.

Further, when $O_2$ gas is supplied into the reaction vessel 203, an oxidizing agent (an O-containing gas) such as steam ($H_2O$ gas) or carbon monoxide (CO) gas may be supplied in place of $O_2$ gas. In this case, the effect of promoting both of the above-described cleaning and modification treatment can be similarly obtained.

In addition, when $H_2$ gas and HCl gas are supplied into the reaction vessel 203, $N_2$ gas may be added as a carrier gas from the gas supply pipes 232a to 232c. Since the blowout flow velocity of the gas from the nozzles 249a to 249c can be regulated by adding $N_2$ gas, generation of a portion where the above-described cleaning and modification treatment is incomplete can be prevented. Rare gas such as Ar gas or He gas may be supplied in place of $N_2$ gas.

Upon completion of the above-described cleaning and modification treatment, output of the zone heater 207 is reduced, the temperature in the reaction vessel 203 is decreased, for example, to 200° C. or less, that is, the temperature is decreased to a temperature at which the seed crystal substrate 20 can be loaded into the reaction vessel 203. Further, the supply of $H_2$ gas and HCl gas into the reaction vessel 203 is stopped and the inside of the reaction vessel is purged with $N_2$ gas. Upon completion of the purge in the reaction vessel 203, the opening degree of the APC valve 244 is regulated so that the pressure in the reaction vessel 203 becomes atmospheric pressure or slightly higher than atmospheric pressure, while maintaining the supply of $N_2$ gas into the reaction vessel 203.

(Normal Baking Step)

The above-described high temperature baking step is conducted when the inside of the reaction chamber 201 and the inside of the exchanging chamber 202 are exposed to the atmospheric air. However, when the crystal growth step is performed, the inside of the reaction chamber 201 and the inside of the exchanging chamber 202 are not ordinarily exposed to atmospheric air before, during, and after the crystal growth step. Accordingly, the high temperature baking step is not required. In this case, since the crystal growth step is performed, polycrystalline GaN will adhere to the surfaces of the nozzles 249a to 249c, the surface of the susceptor 208, and the inside wall of the heat shield wall 211. When the subsequent crystal growth step is conducted with the polycrystalline GaN remaining, polycrystalline GaN powder, Ga droplets or the like, scattered upon separation from the polycrystal, will adhere to the seed crystal substrate 20. As a result, good crystal growth is inhibited. Therefore, the normal baking step is conducted after the crystal growth step in order to remove the above-described polycrystalline GaN. As for the procedures and conditions of the normal baking step, the internal heater 210 is in the off state, the temperature in the neighborhood of the susceptor 208 is set to the temperature from 1000 to 1200° C., an etching sequence is similar to the etching sequence in the high temperature baking step, and baking is performed for about 30 to 120 minutes. Since the normal baking step is performed, the polycrystalline GaN can be removed from the reaction chamber 201.

(Crystal Growth Step)

After the high temperature baking step or the normal baking step is conducted, and upon completion of decrease of the temperature and the purge of inside of the reaction vessel 203, as shown in FIG. 3, the furnace port 221 of the reaction vessel 203 is opened, and the seed crystal substrate 20 is mounted on the susceptor 208. The furnace port 221 is isolated from the atmospheric air and connected to the glove box 220 which is continuously purged with $N_2$ gas. The glove box 220 includes, as described above, a transparent acrylic wall, a plurality of rubber gloves connected to holes penetrating the wall, and a pass box to put an object in and out of the glove box 220. Since the atmospheric air in the pass box is replaced with $N_2$ gas, the object can be put in and out of the glove box 220 without letting the atmospheric air to be incorporated in the glove box 220. Since the mounting operation of the seed crystal substrate 20 is conducted using such a mechanism, re-contamination of each member in the reaction vessel 203 and re-adhesion of the impurity gas to these members can be prevented, the member being after completion of cleaning and modification through a high temperature baking step described later. The surface of the seed crystal substrate 20 to be mounted on the susceptor 208, that is, the main surface (crystal growth surface, base surface) on the side facing the nozzles 249a to 249c is to be, for example, (0001) plane, that is, +c-plane (Ga polar plane) of the GaN-crystal.

Figure 4A:
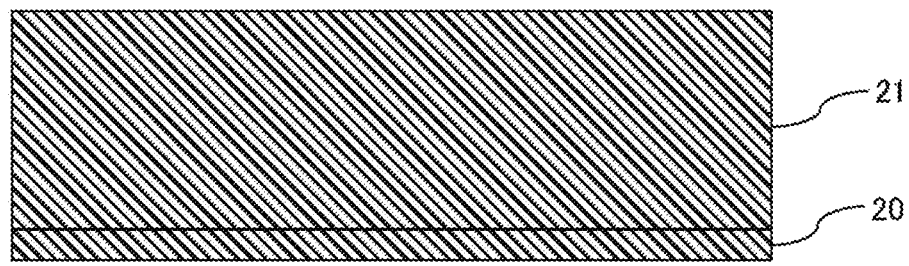
FIG. 4A is a diagram illustrating a state where a GaN-crystal film 21 has been grown thicker on a seed crystal substrate 20.

Upon completion of loading the seed crystal substrate 20 into the reaction chamber 201, the furnace port 221 is closed, and the supply of $H_2$ gas, or $H_2$ gas and $N_2$ gas into the reaction chamber 201 is started while heating and exhausting the reaction chamber 201. Thereafter, when the temperature and the pressure inside of the reaction chamber 201 respectively reach a desired treatment temperature and a desired treatment pressure to attain a desired atmosphere in the reaction chamber 201, the supply of HCl gas and $NH_3$ gas from the gas supply pipes 232a, 232b is started, and the GaCl gas and $NH_3$ gas are supplied to the surface of the seed crystal substrate 20. Accordingly, as shown in a cross-sectional view in FIG. 4A, the GaN-crystal is epitaxially grown on the surface of the seed crystal substrate 20 to form a GaN-crystal film 21.

In this step, the supply of $NH_3$ gas into the reaction chamber 201 is preferably started before or at the time when the temperature of the seed crystal substrate 20 reaches 500° C., in order to prevent thermal decomposition of the GaN-crystal which is included in the seed crystal substrate 20. Further, in order to improve in-plane film thickness uniformity or the like of the GaN-crystal film 21, this step is preferably conducted while the susceptor 208 being rotating.

In this step, the temperature of the zone heater 207 is set to, for example, from 700 to 900° C. for the upstream-side heater surrounding the gas generator 233a, whereas the temperature is set to, for example, from 1000 to 1200° C. for the downstream-side heater surrounding the susceptor 208. Accordingly, the temperature of the susceptor 208 is regulated to a predetermined crystal growth temperature from 1000 to 1200° C. In this step, the internal heater 210 may be used in the off state but temperature control may be conducted using the internal heater 210 so long as the temperature of the susceptor 208 is in the above-described range from 1000 to 1200° C.

Examples of other treatment conditions of this step include the followings:

Treatment pressure: 0.5 to 2 atm;
Partial pressure of GaCl gas: 0.1 to 20 kPa;
Partial pressure of $NH_3$ gas/partial pressure of GaCl gas: 1 to 100; and
Partial pressure of $H_2$ gas/partial pressure of GaCl gas: 0 to 100.

Further, when GaCl gas and NH$_3$ gas are supplied to the surface of the seed crystal substrate 20, N$_2$ gas may be added as a carrier gas from each of the gas supply pipes 232a to 232c. Since N$_2$ gas is added to regulate the blowout flow velocity of the gas supplied from the nozzles 249a to 249c, distribution of a supply amount or the like of the source gas on the surface of the seed crystal substrate 20 can be appropriately controlled, and a uniform growth rate distribution across the surface can be attained. Rare gas such as Ar gas or He gas may be supplied in place of N$_2$ gas.

(Unloading Step)

When the GaN-crystal film 21 is grown to a desired thickness on the seed crystal substrate 20, the supply of HCl gas and H$_2$ gas into the reaction chamber 201 and heating by the zone heater 207 are stopped while supplying NH$_3$ gas and N$_2$ gas into the reaction chamber 201 and exhausting the reaction chamber 201. When the temperature in the reaction chamber 201 is decreased to 500° C. or less, the supply of NH$_3$ gas is stopped, and atmosphere in the reaction chamber 201 is replaced with N$_2$ gas and is restored to the atmospheric pressure. Then, the temperature in the reaction chamber 201 is decreased, for example, to a temperature of 200° C. or less, that is, a temperature at which the crystal ingot of the GaN (the seed crystal substrate 20 with the GaN-crystal film 21 formed on the surface) can be unloaded from the reaction vessel 203. Thereafter, the crystal ingot is unloaded from the reaction chamber 201 through the glove box 220 and the pass box.

(Slicing Step)

Figure 4B:
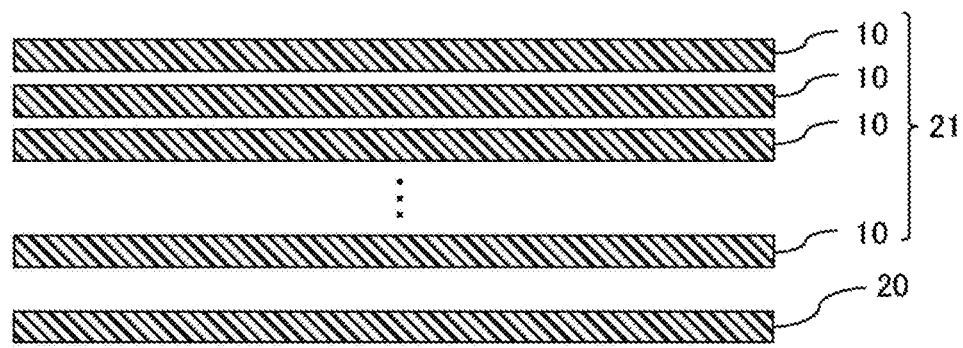
FIG. 4B is a diagram illustrating a state where a plurality of GaN-substrates 10 is obtained by slicing the GaN-crystal film 21 which has been grown thicker.

Since the unloaded crystal ingot is subsequently sliced, for example, in parallel to a growth plane, one or more substrates 10 can be obtained as shown in FIG. 4B. This slicing process can be conducted using, for example, a wire saw or an electric discharge machine. Since the front surface (+c-plane) of the substrate 10 is subsequently subjected to a predetermined abrasive machining, this plane may be processed into an epi-ready, mirror-surface. The rear surface (−c-plane) of the substrate 10 is processed into a lap-surface or a mirror-surface.

The above-described high temperature baking step, the normal baking step, the crystal growth step and the unloading step are preferably conducted in the order described below. Namely, for example, the following steps are conducted in the following order: exposing the inside of the reaction chamber 201 and the exchanging chamber 202 to atmospheric air→high temperature baking step→crystal growth step→unloading step→(normal baking step→crystal growth step→unloading step)×n, where n is an integer of 1 or more.

(3) Effect Obtained According to this Embodiment

According to this embodiment, one or more effects shown below may be obtained.

(a) Since the high temperature baking step is conducted while an oxidizing sequence and an etching sequence are alternately repeated under the above-described treatment conditions before conducting the crystal growth step, each of the concentrations of Si, B, Fe, O, and C in the GaN-crystal obtained in this embodiment is as extremely small as less than $1 \times 10^{15}$ at/cm$^3$.

The concentrations of these impurities of Si, B, and Fe are not actually measured concentrations of the respective impurities but indicate the current lower limit of detection in SIMS measurement which is a representative technique of analyzing impurities. In other words, it means that the actual concentrations of the respective impurities were able to be reduced to such a low value that cannot be detected according to the current technique.

In Raster change method, the lower limit of detection is $5 \times 10^{14}$ at/cm$^3$ for the concentration of O and $1 \times 10^{14}$ at/cm$^3$ for the concentration of C. The inventors of the present invention have confirmed that, when the treatment conditions of this embodiment are optimized within the above-described range, for example, when the time for conducting an oxidizing sequence and an etching sequence is set to 60 minutes or more in total or the cycle is repeated four times or more, each of the concentrations of O and C can be less than $5 \times 10^{14}$ at/cm$^3$ while each of the concentrations of Si, B, and Fe in the GaN-crystal can be less than $1 \times 10^{15}$ at/cm$^3$. The inventors of the present invention have confirmed that, when the treatment conditions of this embodiment are further optimized within the above-described range, for example, when the time for conducting oxidizing and etching sequences is set to 120 minutes or more in total or the cycle is repeated eight times or more, the concentration of O can be less than $5 \times 10^{14}$ at/cm$^3$ and the concentration of C can be less than $1 \times 10^{14}$ at/cm$^3$ while each of the concentrations of Si, B, and Fe in the GaN-crystal is less than $1 \times 10^{15}$ at/cm$^3$.

The GaN-crystal obtained according to this embodiment has extremely excellent crystal quality, for example, greatly reduced defect density, dislocation density, compared to the conventional GaN-crystal, for example, the GaN-crystals obtained by the methods disclosed in Patent Documents 1 to 3, which contain these impurities in a larger amount.

The GaN-crystal obtained in this embodiment is a crystal in which cracks may hardly occur when grown into a thick film or subjected to a slicing process. The reason is considered that reduced concentration of impurities relative to the conventional concentration of impurities increases a hardness of the GaN crystal and thus suppresses plastic deformation of the crystal during growing an ingot. In order to measure a hardness of the crystal, a nanoindentation method using an indenter with a maximum load applied thereto being within the range of 1 mN or more and 50 mN or less is suitable.

Investigation of a hardness of the GaN crystal according to the present method has confirmed that a hardness of the crystal never exceeds 22 GPa and is, for example, in a range between 19.7 and 21.8 GPa when the crystal contains at least any one of B, Fe, O, and C at the concentration of $1 \times 10^{15}$ at/cm$^3$ or more.

On the other hand, it has been confirmed that, when each of the concentrations of B, Fe, O, and C in the GaN-crystal is less than $1 \times 10^{15}$ at/cm$^3$, as is in this embodiment, a hardness of the crystal exceeds 22.0 GPa and is, for example, as extremely high as 22.5 GPa. It has also been confirmed that, when each of the concentrations of B and Fe is less than $1 \times 10^{15}$ at/cm$^3$ and each of the concentrations of O and C is less than $5 \times 10^{14}$ at/cm$^3$ in the GaN-crystal, a hardness of the crystal exceeds 22.5 GPa and is, for example, as extremely high as 23.2 GPa. It has also been confirmed that, when each of the concentrations of B and Fe is less than $1 \times 10^{15}$ at/cm$^3$, the concentration of O is less than $5 \times 10^{14}$ at/cm$^3$ and the concentration of C is less than $1 \times 10^{14}$ at/cm$^3$ in the GaN-crystal, a hardness of the crystal exceeds 23.2 GPa and is, for example, as extremely high as 25.5 GPa. Incidentally, it has been confirmed that addition of Si at the concentration within a range of $1 \times 10^{15}$ at/cm$^3$ to $1 \times 10^{19}$ at/cm$^3$ has no remarkable effect on a hardness of the GaN-crystal.

In view of foregoing, the GaN-crystal according to this embodiment is sliced to obtain a substrate 10, and when the resulting substrate is used to fabricate a semiconductor device, diffusion of the impurities may be suppressed compared to a case of using a substrate containing the conventional GaN-crystal which contains more impurities, and, as a result, improved property and prolonged service life of the device can be obtained. Moreover, since a hardness of the GaN crystal is increased, occurrence of cracks can be prevented both when the ingot is grown and when ingot is sliced. As a result, both the ingot and the substrate 10 may be produced with high yield.

(b) Since the high temperature baking step is conducted while an oxidizing sequence and an etching sequence are alternately repeated under the above-described treatment conditions before conducting the crystal growth step, each of the concentrations of O and C in the GaN-crystal obtained in this embodiment can be less than $1\times10^{15}$ at/cm$^3$ in a region of 60% or more, and in a region of 70% or more of a main surface of the GaN-crystal, that is, a main surface of the GaN substrate depending on the case.

It is seemingly because the amount of an outgas generated from members in the reaction vessel 203 can be significantly reduced during the crystal growth step by performing the high temperature baking step using the above-described method under the above-described conditions. Since treatment conditions in the high temperature baking step is appropriately selected, each of the concentrations of O and C in the crystal can be less than $5\times10^{14}$ at/cm$^3$ in a region of 60% or more of the main surface of the substrate 10, and in a region of 70% or more of the main surface of the substrate depending on the case. In addition, the concentration of C in the crystal can be less than $1\times10^{14}$ at/cm$^3$ in a region of 60% or more of the main surface, and in a region of 70% or more of the main surface of the substrate 10 depending on the case.

As described below, when an oxidizing sequence is not conducted during the high temperature baking step, an effect of reducing each of the concentrations of O and C is limited, for example, the effect can be obtained only in the vicinity of the center of a main surface of the substrate even if the treatment temperature is set to around 1600° C. In other words, each of concentration of O and C in the GaN crystal cannot be less than $1\times10^{15}$ at/cm$^3$ in a region of 60% or more of the main surface of the GaN crystal as in this embodiment.

(c) Since the GaN-crystal obtained according to this embodiment is of high purity as described above, it possesses high insulation property, i.e., electric resistivity of $1\times10^{6}$ Ωcm or more under a temperature condition of 20° C. or more and 300° C. or less. Namely, when the GaN-crystal contains a large amount of donor impurities such as Si or O, there is known a method, as disclosed in Japanese Unexamined Patent Application Publication No. 2007-534580, of adding into the crystal donor-compensating impurities (hereinafter referred to as compensating impurities) such as Mn, Fe, cobalt (Co), Ni, copper (Cu) in order to improve the insulation property of the crystal. However, this method is disadvantageously accompanied by a problem in that, upon addition of the compensating impurities, the quality of the GaN-crystal is degraded and a hardness of the crystal is decreased. For example, when the compensating impurities are added into the GaN-crystal, a crack is likely to occur in a substrate obtained by slicing the crystal. Further, when the compensating impurities are diffused over the laminated structure formed on the substrate, the quality of the semiconductor device fabricated using this substrate is more likely to be degraded. In contrast, the GaN-crystal according to this embodiment provides high insulation property without adding the compensating impurities, and as a result, a problem of degraded crystallinity can be avoided, which is frequently problematic in the conventional method.

The excellent characteristics relating to insulation described herein can be widely obtained in a region of 60% or more, and in a region of 70% or more of the main surface of the GaN crystal, that is, the main surface of the substrate 10 depending on the case. It is seemingly because each of the concentrations of O and C is less than $1\times10^{15}$ at/cm$^3$ in a region of 60% or more of the main surface, and in a region of 70% or more of the main surface of the substrate 10 depending on the case.

(d) The insulation property of the GaN-crystal obtained according to this embodiment is less temperature dependent and more stable compared to the insulation property obtained by adding an impurity for compensating into the crystal. Indeed, it seems that an insulation property similar to that of the GaN-crystal according to this embodiment can be imparted upon addition of Fe to a GaN-crystal containing Si or O at concentration of, for example, $1\times10^{17}$ at/cm$^3$ or more, the concentration of Fe exceeding the concentration of Si or O. However, the level of Fe which is used as a compensating impurity is as relatively low as about 0.6 eV. Therefore, the insulation property obtained upon addition of Fe may be characteristically more easily deteriorated with increasing temperature, compared to the insulation property of the GaN-crystal according to this embodiment. On the contrary, according to this embodiment, the insulation property can be attained without adding the compensating impurity. Accordingly, the problem of increased temperature dependence can be avoided, which is frequently problematic in the conventional method. The GaN-crystal obtained according to this embodiment has high insulation property, that is, electric resistivity is $1\times10^{6}$ Ωcm or more under a temperature condition of 20° C. or more and 300° C. or less, and further electric resistivity is $1\times10^{5}$ Ωcm under a temperature condition of exceeding 300° C. and 400° C. or less.

The excellent characteristics relating to the temperature dependence described herein is widely obtained in a region of 60% or more of the main surface, and in a region of 70% or more of the main surface of the GaN crystal, that is, the main surface of the substrate 10 depending on the case. It is seemingly because each of the concentrations of O and C is less than $1\times10^{15}$ at/cm$^3$ in a region of 60% or more of the main surface, and in a region of 70% or more of the main surface of the substrate 10 depending on the case.

(e) The GaN-crystal obtained according to this embodiment has high purity as described above. Accordingly, when the crystal is made into an n-type semiconductor by Si ion implantation or when the crystal is made into a p-type semiconductor by Mg ion implantation, an amount of implanted ion can be reduced. In other words, the GaN-crystal according to this embodiment is more advantageous compared to the conventional GaN-crystal which contains more impurities such as Fe, in that a desired semiconductor property can be imparted while suppressing degradation of the crystal resulting from ion implantation as much as possible. In addition, the GaN-crystal according to this embodiment is more advantageous compared to the conventional GaN-crystal containing more impurities also in that the GaN-crystal according to this embodiment has extremely low concentration of impurities which may cause a carrier scattering, and thus can avoid reduced mobility of the carrier.

(f) When members forming at least the above-described high temperature reaction region 201a in the reaction chamber 201 include a non-O-containing heat resistant material such as SiC or graphite, the concentration of O in the GaN-crystal to be grown on the seed crystal substrate 20 can be further reduced. Accordingly, the quality of the GaN-crystal can be further improved, and hence the insulation property can be further improved.

(g) In the reaction chamber 201, when members forming at least the above-described high temperature reaction region 201a include a non-C-containing heat resistant material such as alumina, the concentration of C in the GaN-crystal to be grown on the seed crystal substrate 20 can be further reduced. Accordingly, the quality of the GaN-crystal can be further improved.

Second Embodiment of the Present Invention

Next, the second embodiment of the present invention will be explained mainly on the difference from the first embodiment.

The GaN-crystal in this embodiment is similar to the GaN-crystal in the first embodiment in that each of the concentrations of Si, B, O and C is less than $1\times10^{15}$ at/cm$^3$, but different from the GaN-crystal in the first embodiment in that the concentration of Fe is relatively large, that is, $1\times10^{16}$ at/cm$^3$ or more. Since the GaN-crystal in this embodiment contains Fe at such a concentration, it has a greater insulation property compared to that of the GaN-crystal in the first embodiment, that is, an electric resistivity is $1\times10^7$ Ωcm or more under a temperature condition of 20° C. or more and 300° C. or less. The concentration of Fe may be set to, for example, $1\times10^{16}$ at/cm$^3$ or more and $1\times10^{19}$ at/cm$^3$ or less. In this case, the electric resistivity is, for example, $1\times10^7$ Ωcm or more and $5\times10^{10}$ Ωcm or less under a temperature condition of 20° C. or more and 300° C. or less. The distribution of each of the concentrations of O and C in the main surface of the GaN crystal exhibits the same tendency as that in the substrate 10 described in the first embodiment. The same applies to the in-plane distribution regarding the insulation and its temperature dependence.

A Fe-containing gas such as Cp$_2$Fe gas may be supplied along with the source gas (GaCl gas+NH$_3$ gas) from the gas supply pipe 232c to the seed crystal substrate 20 to add Fe into the GaN-crystal, in the above-described crystal growth step. The partial pressure ratio of a Fe-containing gas to a group-III source gas (partial pressure of a Fe-containing gas/total partial pressure of GaCl gas) in the reaction vessel 203 may be, for example, $1/10^6$ to $1/100$. Use of a dopant gas is advantageous in that Fe can be added uniformly across the total region in the direction of thickness of the GaN-crystal, and further, in that it becomes easier to avoid damage inflicted on the surface of the crystal compared to ion implantation described later.

FeCl$_3$ gas may be used in place of Cp$_2$Fe gas. For example, a metallic iron may be placed in a high temperature region at around 800° C. in the middle of the gas supply pipe 232c and HCl gas may be passed therethrough to generate FeCl$_3$ gas. It is advantageous to use FeCl$_3$ gas in place of Cp$_2$Fe gas in that incorporation of the C component included in Cp$_2$Fe gas into the crystal, that is, increase in the concentration of C in the GaN-crystal may be more easily avoided.

Alternatively, the substrate 10 may be obtained in the same manner as in the first embodiment, then Fe ion may be implanted to the resulting substrate 10 to add Fe into the GaN crystal. It is advantageous to use ion implantation in that incorporation of the C component included in Cp$_2$Fe gas into the crystal, that is, increase in the concentration of C in the the GaN-crystal may be more easily avoided.

Compared to the conventional GaN-crystal containing more impurities, the GaN-crystal obtained according to this embodiment has a better quality since each of the concentrations of Si, B, O and C in the crystal is extremely small like the GaN-crystal according to the first embodiment. According to this embodiment, since the concentration of Fe in the GaN-crystal may be increased as described above, its insulation property can be enhanced compared to that of the GaN-crystal according to the first embodiment.

Third Embodiment of the Present Invention

Next, the third embodiment of the present invention will be explained mainly on the difference from the first embodiment.

The GaN-crystal in this embodiment is similar to the GaN-crystal of the first embodiment in that each of the concentrations of B, Fe, O and C in the crystal is less than $1\times10^{15}$ at/cm$^3$, but different from the GaN-crystal of the first embodiment in that the concentration of Si is $1\times10^{15}$ at/cm$^3$ or more. Since the GaN-crystal in this embodiment contains Si at such a concentration, it has conductive property, that is, an electric resistivity of $1\times10^2$ Ωcm or less under a temperature condition of 20° C. or more and 300° C. or less, and functions as a so-called n-type semiconductor crystal. For example, the Si concentration may be $1\times10^{15}$ at/cm$^3$ or more and $5\times10^{19}$ at/cm$^3$ or less. In this case, the concentration of the n-type carrier under a temperature condition of 20° C. or more and 300° C. or less is, for example, $1\times10^{15}$/cm$^3$ or more and $5\times10^{19}$/cm$^3$ or less, and electric resistivity is, for example, $1\times10^{-4}$ Ωcm or more and 100 Ωcm or less under the same temperature conditions. The distribution of each of the concentrations of O and C in the main surface of the GaN crystal exhibits the same tendency as that in the substrate 10 described in the first embodiment. The same applies to the in-plane distribution regarding the conductivity as a n-type semiconductor and its temperature dependence.

In the GaN-crystal according to this embodiment, the concentration of Si and the concentration of the n-type carrier were almost the same value in the crystal. This indicates that the actual concentration of the impurity, from which a carrier is derived, other than Si (Fe or C which compensates an n-type carrier, O which serves as a donor, or the like) is extremely small, and the GaN-crystal contains such an impurity in only a negligible amount compared to $1\times10^{15}$ at/cm$^3$ which is the minimum value of the Si concentration in this embodiment. Although the SIMS measurement can only reveal that each concentrations of B, Fe, O and C is in the order of less than $1\times10^{15}$ at/cm$^3$ and the concentrations of other impurities are less than the lower limit of detection, the concentrations of Si and the n-type carrier in the crystal are indicated as almost the same values, which means that the actual concentration of these impurities is in the order of $10^{14}$ at/cm$^3$ or less.

A Si-containing gas such as SiH$_4$ gas or SiH$_2$Cl$_2$ gas may be supplied along with the source gas (GaCl gas+NH$_3$ gas) to the seed crystal substrate 20 to add Si into the GaN-crystal, in the above-described crystal growth step. The partial pressure ratio of a Si-containing gas to a group-III source gas in the reaction vessel 203 (partial pressure of a Si-containing gas/total partial pressure of GaCl gas) may be, for example, $1/10^8$ to $1/10^3$. Further, the substrate 10 may be obtained in the same manner as in the first embodiment, and then Si ion may be implanted to the resulting substrate 10 to add Si into the GaN-crystal.

Since each of the concentrations of B, Fe, O and C in the crystal is extremely small like the GaN-crystal obtained according to the first embodiment, the GaN-crystal obtained according to this embodiment has a better quality compared to the conventional GaN-crystal containing more impurities. According to this embodiment, since the concentration of impurities such as Fe in the GaN-crystal is small as described above, a desired conductive property (n-type semiconductor property) may be imparted to the GaN-crystal even when an amount of the Si to be added is suppressed. The GaN-crystal according to this embodiment is more advantageous in that a desired semiconductor property may be imparted while suppressing degradation of crystal resulting from Si addition as much as possible compared to the conventional GaN-crystal containing more impurities such as Fe or C. Further, the GaN-crystal according to this embodiment is more advantageous compared to the conventional GaN-crystal containing more impurities in that the GaN-crystal according to this embodiment has extremely low concentration of impurities which may cause a carrier scattering, and thus can avoid reduced mobility of the carrier. It has also been confirmed that the similar effect may be obtained using Ge alternative to or in addition to Si as an n-type dopant.

Variation of the Third Embodiment of the Present Invention

In the third embodiment described above, since the amount of a Si-containing gas to be supplied in the crystal growth step is further reduced, the n-type carrier concentration may be $1\times10^{14}$ to $1\times10^{15}$ at/cm$^3$. In this case, however, the Si concentration in the crystal cannot be measured. Only what can be said at present is that the Si concentration is less than $1\times10^{15}$ at/cm$^3$. Ge may be used alternative to or in addition to Si as an n-type dopant.

Fourth Embodiment of the Present Invention

Next, the fourth embodiment of the present invention will be explained mainly on the difference from the first embodiment.

The GaN-crystal according to this embodiment is similar to the first embodiment in that each of the concentrations of Si, B, Fe, O and C in the crystal is less than $1\times10^{15}$ at/cm$^3$, but is different from the first embodiment in that it further contains Mg at the concentration of $3\times10^{18}$ at/cm$^3$ or more. Since the GaN-crystal in this embodiment contains Mg at such a concentration, it has conductive property where electric resistivity is less than $1\times10^2$ Ωcm under a temperature condition of 20° C. or more and 300° C. or less, and functions as a so-called p-type semiconductor crystal. The concentration of Mg may be, for example, $1\times10^{17}$ at/cm$^3$ or more and $5\times10^{20}$ at/cm$^3$ or less. In this case, the concentration of the p-type carrier is, for example, $5\times10^{15}$/cm$^3$ or more and $5\times10^{18}$/cm$^3$ or less under a temperature condition of 20° C. or more and 300° C. or less, electric resistivity is, for example, 0.5 Ωcm or more and 100 Ωcm or less under the same temperature conditions. The distribution of each of the concentrations of O and C in the main surface of the GaN crystal exhibits substantially the same tendency as that in the substrate 10 described in the first embodiment. The same applies to the in-plane distribution regarding the conductivity as a p-type semiconductor and its temperature dependence.

A Mg-containing gas such as Cp$_2$Mg gas may be supplied along with the source gas (GaCl gas+NH$_3$ gas) to the seed crystal substrate 20 to add Mg into the GaN-crystal, in the above-described crystal growth step. The partial pressure ratio of a Mg-containing gas to a group-III source gas in the reaction vessel 203 (partial pressure of a Mg-containing gas/total partial pressure of GaCl gas) may be, for example, $\frac{1}{10^5}$ to $\frac{1}{10^2}$. Further, in order to add Mg into the GaN-crystal, a gas containing magnesium nitride (Mg$_3$N$_2$) or metallic Mg may be used in place of Cp$_2$Mg gas or the like. Regarding these gases, for example, Mg$_3$N$_2$ or metallic Mg may be placed in a high temperature region at about 800° C. in the middle of the gas supply pipe 232c to generate vapor of these materials. Alternatively, the substrate 10 may be obtained in the same manner as in the first embodiment and thereafter Mg ion may be implanted to this substrate 10 to add Mg into the GaN-crystal. Similar to the second embodiment, use of a dopant gas is advantageous in that Mg can be added uniformly across the total region in the direction of thickness of the GaN-crystal, and further, in that it becomes easier to avoid damage inflicted on the surface of the crystal attributable to the ion implantation. It is also advantageous to use ion implantation in that incorporation of the C component included in Cp$_2$Mg gas, that is, increase in the concentration of C in the GaN-crystal may be more easily avoided.

Since each of the concentrations of Si, B, Fe, O and C in the crystal is extremely small like the GaN-crystal obtained according to the first embodiment, the GaN-crystal obtained according to this embodiment has a better quality compared to the conventional GaN-crystal containing larger amounts of these impurities. According to this embodiment, since the concentration of impurities such as Si, O in the GaN-crystal is small as described above, a desired conductive property (p-type semiconductor property) may be imparted to the GaN-crystal even when an amount of the Mg to be added is suppressed. The GaN-crystal according to this embodiment is more advantageous compared to the conventional GaN-crystal containing more impurities such as Si or O in that a desired semiconductor property may be imparted while suppressing degradation of crystal quality resulting from Mg addition as much as possible. Further, the GaN-crystal according to this embodiment is more advantageous compared to the conventional GaN-crystal containing more impurities in that the GaN-crystal according to this embodiment has extremely low concentration of impurities which may cause a carrier scattering, and thus can avoid reduced mobility of the carrier.

Other Embodiments of the Present Invention

The embodiments of the present invention have been specifically explained. However, the present invention is not construed to be limited to the above-described embodiments, and various changes may be made without departing from the gist of the invention.

(a) The present invention can be suitably applied to growth of not only GaN, but also, for example, a group-III nitride crystal such as aluminum nitride (AlN), aluminum gallium nitride (AlGaN), indium nitride (InN), indium gallium nitride (InGaN), or aluminum indium gallium nitride (AlInGaN), that is, a crystal represented by the composition formula of In$_x$Al$_y$Ga$_{1-x-y}$N (satisfying 0≤x≤1, 0≤y≤1, 0≤x+y≤1).

(b) The crystal growth step of the present invention may include not only the method explained in the above-described embodiment but also a combination of the following methods.

For example, since dimension and shape of a gas generator are optimized, stay (contact) time of HCl gas on the Ga melt may be extended (e.g., to 1 minute or more) and the concentration of impurities contained in GaCl gas may be further reduced. Alternatively, for example, a nano mask, which includes a plurality of micropores having ability to capture impurities formed thereon and contains titanium nitride (TiN), is pre-formed on a seed crystal substrate, and the GaN-crystal may be grown thereon. Alternatively, for example, when crystal growth is progressed on the seed crystal substrate, a growth period in a facet state rather than on a c-plane can be shortened, in which state impurity is easily incorporated. As described above, when facet growth is conducted on the seed crystal substrate, it is preferable to obtain the substrate 10 by growing the GaN layer thicker, peeling the resultant from the seed crystal substrate, and removing the crystal which has been grown in a facet state on the heterogeneous substrate side.

According to the methods described in the first to fourth embodiments, such methods by themselves can greatly reduce the concentration of impurities in the GaN-crystal as described above. In addition, the concentration of impurities in the crystal may be more reliably reduced by using the method in combination with an auxiliary method described herein. However, since the high temperature baking step is not conducted but a simple combination of these auxiliary procedures is used, various effects explained in the above embodiments cannot be attained. In order to attain various effects explained in the above embodiments, it is essential to conduct the high temperature baking step in which an oxidizing sequence and an etching sequence are alternately repeated under the predetermined condition described above.

(c) The GaN-crystal obtained according to the present invention is not limited to the case where it is constituted as a substrate, but also may be a crystal layer constituting a part of a semiconductor device.

For example, since any one layer of a semi-insulating layer comprising the semi-insulating crystals described in the first and second embodiments, an n-type semiconductor layer containing the n-type semiconductor crystal described in the third embodiment, and a p-type semiconductor layer containing the p-type semiconductor crystal described in the fourth embodiment is arbitrarily combined and layered (junction), various semiconductor devices can be fabricated.

Specifically, since a laminate structure including a junction-plane (pn-junction plane) between the p-type semiconductor layer and n-type semiconductor layer described above is fabricated, this laminate structure may be made to function as a pn-junction diode. Alternatively, since a laminate structure including a junction-plane (Schottky barrier junction-plane) between either of the p- and n-type semiconductor layers described above and a metal layer containing metal is fabricated, this laminate structure may be made to function as a Schottky barrier diode. In order to form the p-type semiconductor layer or the n-type semiconductor layer, as described above, a doping gas may be used to add Si or Mg into the crystal, or Si or Mg ion implantation may be conducted to the semi-insulating layer. Alternatively, since Fe or C ion implantation is conducted to the semi-insulating layer, the n-type semiconductor layer, and the p-type semiconductor layer described in the respective embodiments described above, these layers may be made to function as an element isolating layer (insulating layer) for inter-elements insulation of the elements formed on the substrate.

When a semiconductor device is manufactured using the GaN crystal obtained according to the present invention, the characteristics of the semiconductor device can be significantly improved because of the extremely low impurity concentration of this crystal. Since such an extremely low impurity concentration is widely attained in a region of 60% or more, and in a region of 70% or more of the main surface of the crystal depending on the case, the manufacturing yield of the semiconductor device can be significantly improved.

EXAMPLES

The experimental results supporting the effect of the embodiments described above will be hereinafter explained. (Temperature Dependence f Electric Resistivity)

Figure 2:
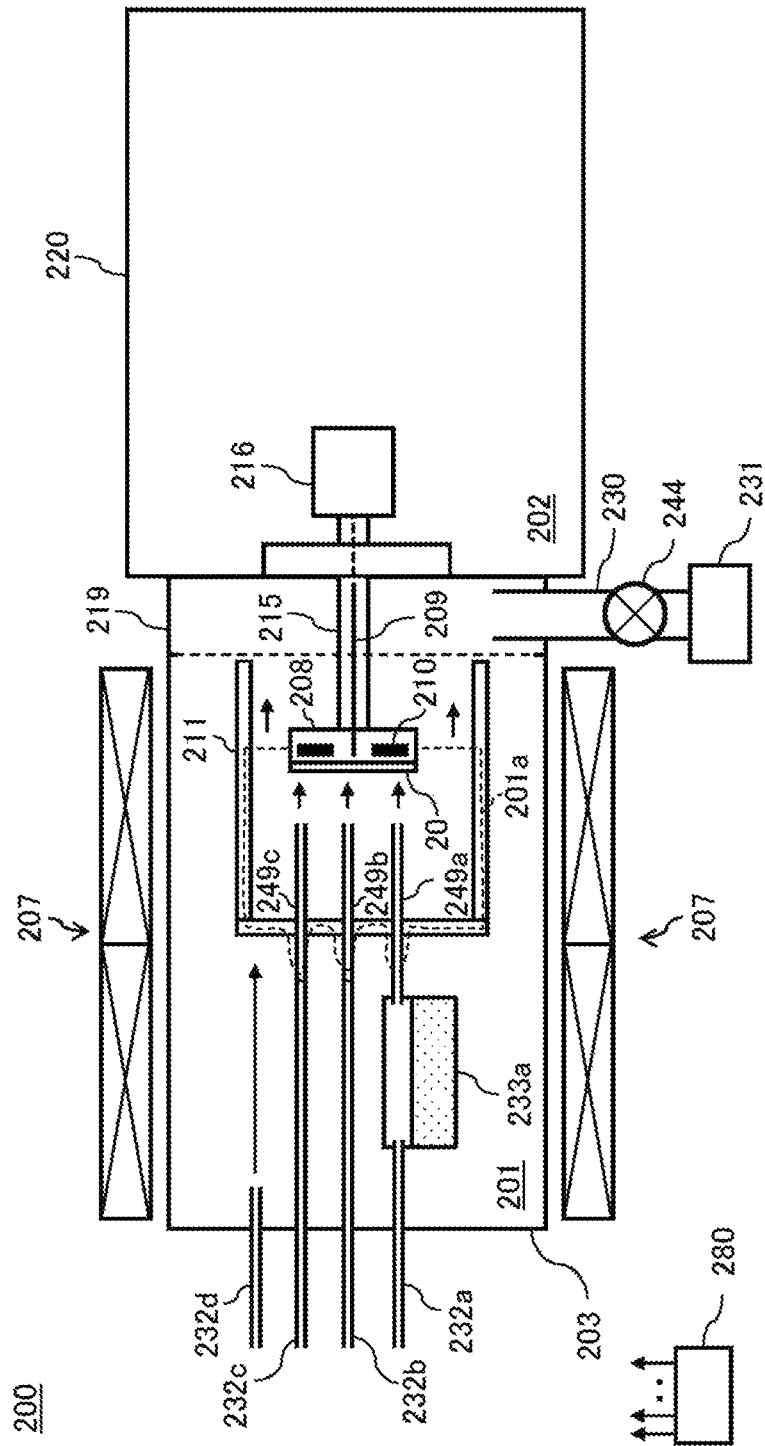
FIG. 2 is a schematic block diagram of a vapor phase growth apparatus 200, illustrating a state of conducting a step of crystal growth in a reaction vessel 203.

As samples 1 to 7, the GaN-single crystal was grown to the thickness of 2 mm on a seed crystal substrate containing a GaN-single crystal using an HVPE apparatus shown in FIG. 2.

In order to confirm effect of impurity removal, a reaction chamber 201 and an exchanging chamber 202 were released to an atmospheric air before growing all of the samples. In order to prepare samples 1 to 5, the high temperature baking step of alternately repeating an oxidizing sequence and an etching sequence was conducted before the crystal growth step. The temperature conditions of the high temperature baking step were 1600° C., 1500° C., 1500° C., 1400° C., 1100° C. in the order from sample 1 through sample 5. All the pressure conditions were set to 1 atm. Partial pressure of 02 gas was within the scope of the treatment conditions described in the first embodiment described above, and common to the samples 1 to 5. Other treatment conditions were the predetermined condition within the scope of the treatment conditions described in the first embodiment described above, and common to the samples 1 to 5.

When samples 6 and 7 were prepared, the above-described high temperature baking step was not conducted before the crystal growth step. Other treatment conditions were common to the preparations of samples 1 to 5.

In any of samples 1 to 7, the GaN-crystal was grown so that its surface became a mirror-surface. However, in samples 4 to 7 which had not been subjected to the high temperature baking at 1500° C. or more, there occurred a slight crack in the crystal. In samples 1 to 3 which had been subjected to the high temperature baking step at 1500° C. or more, there occurred no crack in the GaN-crystal.

In the crystal growth step to prepare samples 1 and 3 to 5, Fe was not added to the GaN-crystal to be grown on the seed crystal substrate. On the other hand, in the crystal growth step to prepare samples 2, 6, and 7, Fe was added to the GaN-crystal to be grown on the seed crystal substrate. The concentration of Fe in the GaN-crystal in the samples 2, 6, and 7 were $1\times10^{16}$ at/cm$^3$, $1\times10^{19}$ at/cm$^3$, and $1\times10^{18}$ at/cm$^3$, in this order. Other treatment conditions were within the scope of the treatment conditions described in the first embodiment described above, and common to the samples 1 to 7.

Figure 5:
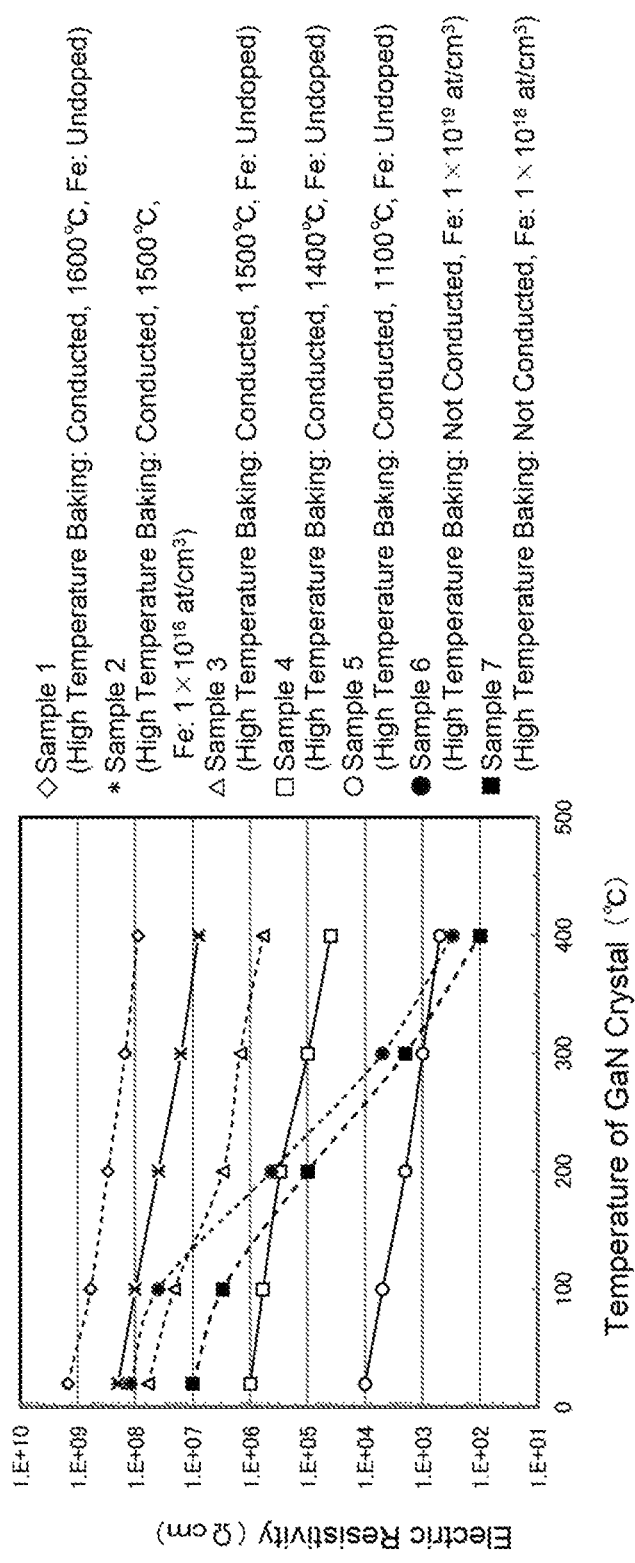
FIG. 5 is a diagram illustrating an evaluation result of electric resistivity of the GaN-crystal.

Next, each GaN crystal of samples 1 to 7 was evaluated for temperature dependence of electric resistivity. The evaluation results are illustrated in FIG. 5. In FIG. 5, the horizontal axis represents temperature (° C.) of the GaN in the measurement of the electric resistivity, and the longitudinal axis represents electric resistivity (Ωcm) of the GaN crystal. In figure, ◇, *, ∆, □, ○, ●, and ■ represent evaluation results of samples 1 to 7 in this order.

As can be seen from FIG. 5, mutual comparison of samples 1 to 5 reveals that the sample whose temperature condition in the high temperature baking step is set to 1500° C. or more (e.g., samples 1 to 3) exhibits higher electric resistivity, that is, higher insulation property under any temperature conditions, compared to the sample whose temperature condition in the high temperature baking step is set to less than 1500° C. (e.g., samples 4 and 5). Specifically, it is found that electric resistivity is $1 \times 10^6$ Ωcm or more under a temperature condition of 20° C. or more and 300° C. or less in samples 1 to 3, whereas electric resistivity is less than $1 \times 10^6$ Ωcm under the same temperature condition in other samples. It is also found that electric resistivity is $1 \times 10^5$ Ωcm or more under a temperature condition of exceeding 300° C. and 400° C. or less in samples 1 to 3, whereas electric resistivity is less than $1 \times 10^5$ Ωcm under the same temperature condition in other samples. It is seemingly because the concentrations of various impurities contained in the GaN crystal could be reduced since the temperature conditions in the high temperature baking step was set to the above-described condition.

Moreover, comparison between samples 2 and 3 reveals that sample 2 with Fe added thereto exhibits higher insulation property than sample 3 with no Fe added thereto. As can be seen, if the temperature in the high temperature baking step is set to almost the same temperature, addition of Fe at the concentration of $1 \times 10^{16}$ at/cm$^3$ or more into the GaN crystal may further enhance insulation property. In other words, addition of Fe may provide the same effect as in the case where temperature condition in the high temperature baking step is raised. According to an additional experiment of the inventors of the present invention, it has been confirmed that electric resistivity of the GaN-crystal under a temperature condition of 20° C. or more and 300° C. or less is raised, for example, up to a range of $1 \times 10^8$ Ωcm or more and $5 \times 10^{10}$ Ωcm or less, when each of the concentrations of Si, B, O and C in the GaN-crystal is less than $1 \times 10^{15}$ at/cm$^3$ and the concentration of Fe is a predetermined concentration of $1 \times 10^{16}$ at/cm$^3$ or more and $1 \times 10^{19}$ at/cm$^3$ or less.

In addition, comparison of samples 1 to 5 with samples 6, 7 reveals that in samples 1 to 5 which are subjected to the high temperature baking step including an oxidizing sequence, electric resistivity is less likely to be reduced with increasing temperature, that is, insulation property has lower temperature dependence, compared to samples 6, 7 which are not subjected to the high temperature baking step. As in samples 6, 7, addition of Fe at the concentration of $1 \times 10^{17}$ at/cm$^3$ or more may be likely to accompanied by reduced insulation property with increasing temperature although the insulation property under low temperature condition may be enhanced. The reason is as described above. On the other hand, samples 1 to 3 whose temperature condition in the high temperature baking step is 1500° C. or more exhibit insulation property similar to or exceeding insulation property of samples 6, 7. In addition, the insulation property is extremely stable due to its low temperature dependence.

Once released to atmospheric air, crystal growth was continuously repeated without conducting release to atmospheric air between crystal growths as follows: crystal growth→normal baking→crystal growth→normal baking . . . . After crystal growth as described above was repeated 30 to 50 times and measurement of electric property was conducted, almost the same result as described above was obtained. Namely, once the high temperature baking step had been conducted, all of the GaN crystals which had been subsequently grown continued to exhibit high electric resistivity unless released to atmospheric air. On the contrary, when the high temperature baking was not conducted after released to atmospheric air, electric resistivity remained low no matter how many times crystal growth and normal baking were repeated. Regarding behavior during Fe doping, it was found to be necessary to dope Fe at high concentration to enhance insulation property when the high temperature doping was not conducted. In that case, electric resistivity was found to exhibit relatively greater temperature dependence. On the other hand, it was found that samples 1 to 3 which had been subjected to the high temperature baking step at 1500° C. or more exhibited insulation property similar to or exceeding those of samples 6, 7, and that insulation property was extremely stable due to its low temperature dependence (Baking Temperature and Atmosphere Dependence of Concentration of Impurities)

Subsequently, as samples 8 to 16, the GaN-single crystal was grown to the thickness of 5 mm on a seed crystal substrate with a diameter of 2 inches (5.08 cm) using the HVPE apparatus shown in FIG. 2. In order to confirm effect of impurity removal, a reaction chamber and an exchanging chamber were released to an atmospheric air before growing all of the samples.

In preparing samples 8 to 11, the high temperature baking step of conducting an etching sequence alone without conducting an oxidizing sequence before the crystal growth step was conducted, and thereafter the GaN-single crystal was grown on the seed crystal substrate without releasing the inside of the reaction vessel to atmospheric air. The temperature conditions of the high temperature baking step were 1100° C., 1400° C., 1500° C., 1600° C., in the order from sample 8 to sample 11. All the pressure conditions were set to 1 atm.

In preparing samples 12 to 16, the above-described high temperature baking step of alternately repeating an oxidizing sequence and an etching sequence was conducted before conducting the crystal growth step, and thereafter the GaN-single crystal was grown on the seed crystal substrate without releasing the inside of the reaction vessel to atmospheric air. The temperature conditions of the high temperature baking step were 1100° C., 1400° C., 1500° C., 1550° C., 1600° C. in the order from sample 12 to sample 16. All the pressure conditions were set to 1 atm. Partial pressure of 02 gas was the predetermined condition within the scope of the treatment conditions described in the first embodiment described above, and common to the samples 12 to 16.

Further, regarding sample 17, HVPE device in which the inner wall of the reaction vessel and surfaces of members inside the reaction vessel were coated with pBN (pyrolytic boron nitride) was used to grow the GaN-single crystal on the seed crystal substrate. In preparing sample 17, the high temperature baking step of alternately repeating an oxidizing sequence and an etching sequence was not conducted before conducting the crystal growth step.

In the crystal growth step to prepare samples 8 to 17, impurities such as Fe were not added into the GaN-crystal. Other treatment conditions were within the scope of the treatment conditions described in the first embodiment described above, and common to the samples 8 to 17.

After completion of the crystal growth, each GaN crystal of samples 8 to 17 was evaluated for the concentration of impurities contained therein using SIMS. The results are shown in Tables 1 to 3. The right-side columns in Tables 1 to 3 indicate the measuring method employed for SIMS (depth profile or Raster change) and the lower limit of detection in this order. In tables, DL indicates that the measurement result was less than the lower limit of detection.

TABLE 1

| | Sample No. | | | | Measurement | Lower Limit of |
|---|---|---|---|---|---|---|
| | 8 | 9 | 10 | 11 | Method | Detection |
| Baking Temperature | 1100° C. | 1400° C. | 1500° C. | 1600° C. | — | — |
| Oxidizing Sequence | Not included | ← | ← | ← | — | — |
| Etching Sequence | Included | ← | ← | ← | — | — |
| Concentration of Si (at/cm$^3$) | $2 \times 10^{17}$ | $2 \times 10^{15}$ | DL | DL | Depth profile | $1 \times 10^{15}$ |
| Concentration of B (at/cm$^3$) | DL | DL | DL | DL | Depth profile | $1 \times 10^{15}$ |
| Concentration of Fe (at/cm$^3$) | DL | DL | DL | DL | Depth profile | $1 \times 10^{15}$ |
| Concentration of O (at/cm$^3$) | $5 \times 10^{16}$ | $1 \times 10^{16}$ | $4.5 \times 10^{15}$ | $3 \times 10^{15}$ | Raster change | $5 \times 10^{14}$ |
| Concentration of C (at/cm$^3$) | $3 \times 10^{16}$ | $8 \times 10^{15}$ | $3.5 \times 10^{15}$ | $2 \times 10^{15}$ | Raster change | $1 \times 10^{14}$ |
| Hardness (GPa) | 19.7 | 20.2 | 21.2 | 21.5 | | |

TABLE 2

| | Sample No. | | | | | Measurement | Lower Limit of |
|---|---|---|---|---|---|---|---|
| | 12 | 13 | 14 | 15 | 16 | Method | Detection |
| Baking Temperature | 1100° C. | 1400° C. | 1500° C. | 1550° C. | 1600° C. | — | — |
| Oxidizing Sequence | Included | ← | ← | ← | ← | — | — |
| Etching Sequence | Included | ← | ← | ← | ← | — | — |
| Concentration of Si (at/cm$^3$) | $1.5 \times 10^{17}$ | $1.5 \times 10^{15}$ | DL | DL | DL | Depth profile | $1 \times 10^{15}$ |
| Concentration of B (at/cm$^3$) | DL | DL | DL | DL | DL | Depth profile | $1 \times 10^{15}$ |
| Concentration of Fe (at/cm$^3$) | DL | DL | DL | DL | DL | Depth profile | $1 \times 10^{15}$ |
| Concentration of O (at/cm$^3$) | $4.5 \times 10^{16}$ | $1.5 \times 10^{15}$ | $5.5 \times 10^{14}$ | DL | DL | Raster change | $5 \times 10^{14}$ |
| Concentration of C (at/cm$^3$) | $3.0 \times 10^{16}$ | $7.0 \times 10^{14}$ | $2.5 \times 10^{14}$ | $1.5 \times 10^{14}$ | DL | Raster change | $1 \times 10^{14}$ |
| Hardness (GPa) | 19.5 | 21.8 | 22.5 | 23.2 | 25.5 | | |

TABLE 3

| Sample No. | 17(pBN) | Measurement Method | Lower Limit of Detection |
|---|---|---|---|
| Baking Temperature | Not conducted | — | — |
| Oxidizing Sequence | Not included | — | — |
| Etching Sequence | Not included | — | — |
| Concentration of Si (at/cm$^3$) | DL | Depth profile | $1 \times 10^{15}$ |
| Concentration of B (at/cm$^3$) | $2 \times 10^{16}$ | Depth profile | $1 \times 10^{15}$ |
| Concentration of Fe (at/cm$^3$) | DL | Depth profile | $1 \times 10^{15}$ |
| Concentration of O (at/cm$^3$) | $1.0 \times 10^{16}$ | Raster change | $5 \times 10^{14}$ |
| Concentration of C (at/cm$^3$) | $1.0 \times 10^{16}$ | Raster change | $1 \times 10^{14}$ |
| Hardness (Gpa) | 19.8 | | |

As shown in Tables 1 and 2, in samples 8 and 12 (temperature in the high temperature baking: 1100° C.) and samples 9 and 13 (temperature in the high temperature baking: 1400° C.), although each of the concentrations of B and Fe was reduced, the concentration of Si reached $2 \times 10^{17}$ at/cm$^3$, the concentration of O reached $5 \times 10^{16}$ at/cm$^3$, or the concentration of C reached $5 \times 10^{16}$ at/cm$^3$. In these samples which had not been subjected to the high temperature baking at 1500° C. or more, the growth plane of the GaN-crystal became a mirror plane but had a slight crack occurred therein due to incorporated impurities.

Moreover, as shown in Tables 1 and 2, since the surfaces of the members in the reaction vessel were coated with pBN, each of the concentrations of Si and Fe was reduced but B was incorporated at the concentration of $2 \times 10^{16}$ at/cm$^3$, in the GaN-crystal of sample 17. Further, since sample 17 had not been subjected to the above-described high temperature baking step of alternately conducting an oxidizing sequence and an etching sequence, each of the concentrations of O and C reached up to $1 \times 10^{16}$ at/cm$^3$. In sample 17, the growth plane of the GaN-crystal became a mirror plane but had a lot of cracks occurred in the GaN-crystal due to incorporated B or the like.

In view of the foregoing, it is found that a high purity crystal in which all of Si, B, Fe, O, and C exist in extremely low concentration, for example, a high purity crystal in which each of the concentrations of Si, B, and Fe is less than $1 \times 10^{15}$ at/cm$^3$ and each of the concentrations of O and C is less than $5 \times 10^{15}$ at/cm$^3$ cannot be obtained by simply combining the methods described in Patent Documents 1 to 3, that is, a method using a high purity gas as a source gas or a carrier gas and a method including coating an inner wall of a crystal growth furnace.

Tables 1 and 2 reveal that the higher the temperature condition in the high temperature baking step, the more the concentration of impurities contained in the GaN crystal tends to be reduced. In samples 10, 11, 14 to 16 which had been subjected to the high temperature baking step at 1500° C. or more, there was no crack occurred in the GaN crystal probably because of reduction in the concentration of impurities.

In addition, in samples 10 and 11 which had been subjected to the high temperature baking step including only an etching sequence without an oxidizing sequence, each of the concentrations of Si, B, and Fe was less than the lower limit of detection (less than $1 \times 10^{15}$ at/cm$^3$) but each of the concentrations of O and C exceeded $1 \times 10^{15}$ at/cm$^3$. On the other hand, in samples 14 to 16 which had been subjected to the high temperature baking step which included alternately conducting an oxidizing sequence and an etching sequence, each of the concentrations of Si, B, O, C, and Fe was less than the lower limit of detection (less than $1 \times 10^{15}$ at/cm$^3$).

In view of the foregoing, it is found that, in order to grow a high purity crystal in which each of the concentrations of Si, B, Fe, O, and C is less than $1 \times 10^{15}$ at/cm$^3$, it is required not only to set the temperature condition to 1500° C. or more but also to alternately repeat an oxidizing sequence and an etching sequence, in the high temperature baking step.

In an additional experiment, the thickness of the GaN crystal grown on the seed crystal substrate was increased to 8 mm. As a result, the effect of the concentration of impurities was more significantly produced. Specifically, when high purity crystal was grown employing procedures and treatment conditions so that each of the concentrations of B, Fe, O and C was less than $1 \times 10^{15}$ at/cm$^3$, that is, employing procedures and treatment conditions similar to those of preparing samples 14 to 16, there was no crack found in the resulting crystal. A hardness of these crystals exceeded 22.0 GPa, as determined by a nanoindentation method which measures using a diamond indenter having a tip diameter of several tens of nanometers with maximum load of a predetermined magnitude within a range of 1 mN or more and 50 mN or less.

On the other hand, when high purity crystal was grown employing procedures and treatment conditions so that concentration of at least any one of B, Fe, O and C exceeded $1 \times 10^{15}$ at/cm$^3$, that is, employing the procedures and treatment conditions similar to those of preparing samples 8 to 13 and 17, there occurred cracks more or less in the resulting crystal. It is considered because the higher concentration of impurities deteriorated a crystal and reduced a hardness of the crystal. A hardness of these crystals was 21.8 GPa or less, as determined by a nanoindentation method which measures using a diamond indenter having a tip diameter of several tens of nanometers with maximum load of a predetermined magnitude within a range of 1 mN or more and 50 mN or less.

It has been confirmed that addition of Si at the concentration in a range from $1 \times 10^{15}$ at/cm$^3$ to $1 \times 10^{19}$ at/cm$^3$ has no significant effect on a hardness of the GaN-crystal, that is, can suppress occurrence of cracks, so long as each of the concentrations of B, Fe, O and C is less than $1 \times 10^{15}$ at/cm$^3$. A hardness of these crystals exceeded 22.0 GPa, as determined by a nanoindentation method which measures using an indenter having a tip diameter of several tens of nanometers with maximum load of a predetermined magnitude within a range of 1 mN or more and 50 mN or less.

Once released to atmospheric air, crystal growth was continuously repeated without conducting release to atmospheric air between crystal growths as follows: crystal growth→normal baking→crystal growth→normal baking . . . . After crystal growth as described above was repeated 30 to 50 times and measurement of electric property was conducted, almost the same result as described above was obtained. Namely, once the high temperature baking had been conducted, all of the GaN-crystals which had been subsequently grown maintained impurity concentration less than the lower limit of detection unless released to atmospheric air. On the contrary, when the high temperature baking was not conducted after released to atmospheric air, the concentration of impurities never became less than the lower limit of detection no matter how many times crystal growth and normal baking were repeated.

(In-Plane Distribution of Impurity Concentration on Substrate)

Regarding samples 8 to 16 described above, in-plane distribution of the concentrations of O and C in the main surface of the GaN single crystal (substrate) which had been grown on a seed crystal substrate were evaluated. Specifically, the concentrations of O and C were measured using a Raster change method, at a plurality of positions (five positions, i.e., the center, positions apart from the center by ±10 mm, and positions apart from the center by ±20 mm) in the main surface of the crystal of samples 8 to 16. The diameter of the seed crystal substrate is 2 inches (5.08 cm) as described above.

The measurement results of the concentration of O are shown in FIG. 6A and FIG. 7A, and the measurement results of the concentration of C are shown in FIG. 6B and FIG. 7B. Variations (%) shown in FIG. 6A and FIG. 7A are values calculated by the formula: $\{(O_{MAX}-O_{MIN})/O_{AVE}/2\} \times 100$ where, among the concentrations of O measured at 5 points in the main surface, the maximum concentration of O is indicated by, the minimum concentration of O is indicated by $O_{MIN}$ [at/cm$^3$], and the average concentration of O from the five points is indicated by $O_{AVE}$ [at/cm$^3$]. Similarly, variations (%) shown in FIG. 6B and FIG. 7B are values calculated by the formula: $\{(C_{MAX}-C_{MIN})/C_{AVE}/2\} \times 100$ where, among the concentrations of C measured at 5 points in the main surface, the maximum concentration of C is indicated by $C_{MAX}$ [at/cm$^3$], the minimum concentration of C is indicated by $C_{MIN}$ [at/cm$^3$], and the average concentration of C from the five points is indicated by $C_{AVE}$ [at/cm$^3$].

As shown in FIG. 6A and FIG. 6B, in samples 8 to 10 that had been subjected to the high temperature baking step in which the baking temperature was 1500° C. or less and only an etching sequence was conducted without conducting an oxidizing sequence, each of the concentrations of O and C was not able to be less than $1 \times 10^{15}$ at/cm$^3$ anywhere in the main surface. In sample 11 that had been subjected to the baking temperature of 1600° C. and only the etching sequence without conducting the oxidizing sequence, each of the concentrations of O and C in the crystal in a region apart from the center by ±10 mm was able to be less than $1 \times 10^{15}$ at/cm$^3$, but an outer region apart from the center by ±20 mm was not able to be less than $1 \times 10^{15}$ at/cm$^3$. Namely, it was found that each of the concentrations of O and C in the crystal was not be able to be less than $1 \times 10^{15}$ at/cm$^3$ in a region of 60% or more of the main surface in the high temperature baking step when only the etching sequence was conducted without conducting the oxidizing sequence.

As shown in FIG. 7A and FIG. 7B, in sample 12 that had been subjected to the high temperature baking step in which the baking temperature was 1100° C. or more and an oxidizing sequence and an etching sequence were alternately repeated, each of the concentrations of O and C was not able to be less than $1\times10^{15}$ at/cm$^3$ anywhere in the main surface. In sample 13 which had been subjected to a baking temperature of 1400° C. and alternately repeated oxidizing and etching sequences, the concentration of C in the crystal was able to be less than $1\times10^{15}$ at/cm$^3$, but the concentration of O in the crystal was not able to be lower than $1\times10^{15}$ at/cm$^3$ anywhere in the main surface. It was found that each of the concentrations of O and C in the crystal was not able to be less than $1\times10^{15}$ at/cm$^3$ in a region of 60% or more of the main surface at the baking temperature of 1400° C. or less, even when an oxidizing sequence and an etching sequence were alternately repeated in the high temperature baking step. It is seemingly caused by an effect of impurities which remained due to relatively low temperature at which the high temperature baking step to be conducted, although conducting the oxidizing sequence during the high temperature baking step somewhat suppressed an outgas from the members in the reaction vessel.

As shown in FIG. 7A and FIG. 7B, in samples 14 to 16 that had been subjected to the high temperature baking step in which the baking temperature was 1500° C. or more and an oxidizing sequence and an etching sequence are alternately repeated, each of the concentrations of O and C in the crystal was less than $1\times10^{15}$ at/cm$^3$ anywhere in the main surface. In samples 15 and 16 in which the baking temperature was 1550° C. or more, the concentration of 0 in the crystal was less than $5\times10^{14}$ at/cm$^3$ which was the lower limit, and the concentration of C was less than $1\times10^{14}$ at/cm$^3$ which was the lower limit. As described above, it was found that each of the concentrations of O and C in the crystal was able to be less than $1\times10^{15}$ at/cm$^3$ anywhere in a region of 60% or more of the main surface with the high temperature baking step in which the baking temperature was 1500° C. or more and an oxidizing sequence and an etching sequence were alternately repeated. It is seemingly because an outgas from members in the reaction vessel was significantly reduced during the crystal growth step by conducting the high temperature baking step using the above-described method under the above-described conditions.

Preferred Aspect of the Present Invention

Hereinafter, supplementary descriptions of the preferred aspects of the present invention will be given.
(Supplementary Description 1)
According to an aspect of the present invention,
there is provided a nitride crystal,
in which a composition formula is represented by In$_x$Al$_y$Ga$_{1-x-y}$N (satisfying 0≤x≤1, 0≤y≤1, 0≤x+y≤1), and
the concentration of B in the crystal is less than $1\times10^{15}$ at/cm$^3$, and
each of the concentrations of O and C in the crystal is less than $1\times10^{15}$ at/cm$^3$ in a region of 60% or more, and preferably in a region of 70% or more of a main surface of the crystal.
(Supplementary Description 2)
There is provided the crystal according to supplementary description 1, wherein preferably each of the concentrations of Si and Fe in the crystal is less than $1\times10^{15}$ at/cm$^3$.
(Supplementary Description 3)
There is provided the crystal according to supplementary description 2, wherein preferably electric resistivity is $1\times10^6$ Ωcm or more under a temperature condition of 20° C. or more and 300° C. or less.

(Supplementary Description 4)
There is provided the crystal according to supplementary description 1, wherein preferably the concentration of Si in the crystal is less than $1\times10^{15}$ at/cm$^3$ and the concentration of Fe is $1\times10^{16}$ at/cm$^3$ or more.
(Supplementary Description 5)
There is provided the crystal according to supplementary description 4, wherein electric resistivity is $1\times10^7$ Ωcm or more under a temperature condition of 20° C. or more and 300° C. or less.
(Supplementary Description 6)
There is provided the crystal according to supplementary description 1, wherein the concentration of Fe in the crystal is less than $1\times10^{15}$ at/cm$^3$ and the concentration of Si or Ge or the total concentration of Si and Ge in the crystal is $1\times10^{15}$ at/cm$^3$ or more. Preferably, the concentration of Si or Ge or the total concentration of Si and Ge is $5\times10^{19}$ at/cm$^3$ or less.
(Supplementary Description 7)
There is provided the crystal according to supplementary description 6, wherein electric resistivity is $1\times10^2$ Ωcm or less under a temperature condition of 20° C. or more and 300° C. or less. Preferably, the electric resistivity is $1\times10^{-4}$ Ωcm or more under the above-described temperature condition. Preferably, the concentration of a n-type carrier is $1\times10^{15}$/cm$^3$ or more and $5\times10^{19}$/cm$^3$ or less under the above-described temperature condition.
(Supplementary Description 8)
There is provided the crystal according to supplementary description 2, wherein electric resistivity is $1\times10^2$ Ωcm or less under a temperature condition of 20° C. or more and 300° C. or less. Preferably, the electric resistivity is $1\times10^{-4}$ Ωcm or more under the above-described temperature condition. Preferably, the concentration of an n-type carrier is $1\times10^{14}$/cm$^3$ or more and less than $1\times10^{15}$/cm$^3$ under the above-described temperature condition.
(Supplementary Description 9)
There is provided the crystal according to supplementary description 2, wherein the concentration of Mg in the crystal is $1\times10^{17}$ at/cm$^3$ or more. Preferably, the concentration of Mg in the crystal is $5\times10^{20}$ at/cm$^3$ or less.
(Supplementary Description 10)
There is provided the crystal according to supplementary description 9, wherein electric resistivity is $1\times10^2$ Ωcm or less under a temperature condition of 20° C. or more and 300° C. or less. Preferably, the electric resistivity is 0.5 Ωcm or more and 100 Ωcm or less under the above-described temperature condition. Preferably, the concentration of a p-type carrier under the above-described temperature condition is $2\times10^{17}$/cm$^3$ or more and $5\times10^{18}$/cm$^3$ or less.
(Supplementary Description 11)
There is provided a nitride crystal, in which a composition formula is represented by In$_x$Al$_y$Ga$_{1-x-y}$N (satisfying 0≤x≤1, 0≤y≤1, 0≤x+y≤1), and a hardness is more than 22.0 GPa as measured by a nanoindentation method using an indenter with a maximum load applied thereto being within the range of 1 mN or more and 50 mN or less in a region of 60% or more, and preferably in a region of 70% or more of the main surface of the crystal.
(Supplementary Description 12)
There is provided the crystal according to supplementary description 11, wherein preferably a hardness is 22.5 GPa or more as measured by a nanoindentation method using an indenter with a maximum load applied thereto being within the range of 1 mN or more and 50 mN or less in a region of 60% or more of the main surface of the crystal.

(Supplementary Description 13)

There is provided the crystal according to supplementary description 11 or 12, wherein preferably a hardness is 23.2 GPa or more as measured by a nanoindentation method using an indenter with a maximum load applied thereto being within the range of 1 mN or more and 50 mN or less in a region of 60% or more of the main surface of the crystal.

(Supplementary Description 14)

There is provided the crystal according to any one of the supplementary descriptions 1 to 13, wherein preferably each of the concentrations of O and C in the crystal is less than $5 \times 10^{14}$ at/cm$^3$ in a region of 60% or more, preferably in a region of 70% or more of the main surface of the crystal.

(Supplementary Description 15)

There is provided the crystal according to any one of the supplementary descriptions 1 to 13, wherein preferably
the concentration of 0 in the crystal is less than $5 \times 10^{14}$ at/cm$^3$ in a region of 60% or more, preferably in a region of 70% or more of the main surface of the crystal, and
the concentration of C in the crystal is less than $1 \times 10^{14}$ at/cm$^3$ in a region of 60% or more, preferably in a region of 70% or more of the main surface of the crystal.

(Supplementary Description 16)

According to another aspect of the present invention, there is provided a semiconductor device, which is the device having at least one layer of a semi-insulating layer containing the crystal according to supplementary descriptions 2 to 5, an n-type semiconductor layer containing the crystal according to any one of supplementary descriptions 6 to 8, and a p-type semiconductor layer containing the crystal according to supplementary description 9 or 11.

(Supplementary Description 17)

There is provided the device according to supplementary description 16, preferably having a junction plane (pn-junction plane) between the p-type semiconductor layer and the n-type semiconductor layer and serving as a pn-junction diode.

(Supplementary Description 18)

There is provided the device according to supplementary description 16, preferably having a junction plane (Schottky junction plane) between either of the p- and the n-type semiconductor layers and a metallic layer containing metal and serving as a Schottky barrier diode.

(Supplementary Description 19)

There is provided the device according to any one of supplementary descriptions 16 to 18,
preferably having a layer with a predetermined semiconductor property imparted thereto by Si or Mg ion implantation into the semiconductor layer.

(Supplementary Description 20)

There is provided the device according to any one of supplementary descriptions 16 to 19,
preferably having a layer for inter-element insulation by Fe or C ion implantation into the semiconductor layer.

(Supplementary Description 21)

According to another aspect of the present invention, there is provided a planar nitride crystal containing the crystal according to any one of supplementary descriptions 1 to 15 and having a thickness of 250 μm or more, and a diameter of 25 mm or more, preferably 50 mm or more.

(Supplementary Description 22)

According to another aspect of the present invention, there is provided a method of manufacturing a nitride crystal, including:
a crystal growth step of loading a seed crystal substrate and a raw material containing a group-III element into a reaction vessel, supplying a halide of the raw material and a nitriding agent to the seed crystal substrate heated to a predetermined crystal growth temperature, and thereby growing the group-III nitride crystal on the seed crystal substrate; and
a high temperature baking step of:
raising a temperature of a high temperature reaction region in the reaction vessel to 1500° C. or more, the high temperature reaction region being heated to at least around the crystal growth temperature, not partitioned from the region into which the seed crystal substrate is loaded, and possibly in contact with the gas supplied to the seed crystal substrate;
not conducting supply of the nitriding agent into the reaction vessel, but conducting supply of hydrogen gas, a halogen-based gas, and an oxygen-containing gas into the reaction vessel; and
thereby cleaning and modifying a surface of a member forming the high temperature reaction region, wherein the high temperature baking step is conducted before conducting the crystal growth step.

(Supplementary Description 23)

There is provided the method according to supplementary description 22, wherein preferably a member at least a surface of which contains quartz-free and boron-free material is used as the member forming the high temperature reaction region.

(Supplementary Description 24)

There is provided the method according to supplementary description 22 or 23, wherein preferably a member at least a surface of which contains at least any one of alumina, silicon carbide, graphite, and tantalum carbide is used as the member forming the high temperature reaction region.

(Supplementary Description 25)

There is provided the method according to any one of supplementary descriptions 22 to 24,
wherein, in the high temperature baking step, a pressure in the reaction vessel is maintained at a pressure of 0.5 atm or more and 2 atm or less. Preferably, in the high temperature baking step, the temperature of at least the high temperature reaction region in the reaction vessel is maintained at a temperature of 1500° C. or more. Preferably, the high temperature baking step is conducted while exhausting the reaction vessel. Preferably, the high temperature baking treatment is conducted for 30 minutes or more.

(Supplementary Description 26)

There is provided the method according to any one of supplementary descriptions 22 to 25,
wherein, in the high temperature baking step, an oxidizing sequence and an etching sequence are alternately repeated, the oxidizing sequence supplying an oxygen-containing gas and an inert gas into the reaction vessel and the etching sequence supplying an etching gas and hydrogen gas into the reaction vessel.

(Supplementary Description 27)

There is provided the method according to supplementary description 26, wherein, in the high temperature baking step, a total period for conducting the oxidizing sequence and the etching sequence is 30 minutes or more (preferably 60 minutes or more, and more preferably 120 minutes or more). Further, in the high temperature baking step, a cycle of alternately conducting the oxidizing sequence and the etching sequence is repeated twice or more (preferably 4 times or more, and more preferably 8 times or more).

(Supplementary Description 28)

There is provided the method according to supplementary description 26 or 27, wherein, in the oxidizing sequence, partial pressure of an oxygen-containing gas in the reaction vessel is in a range of 0.1% or more and 5% or less of a total partial pressure of gases including hydrogen gas and halogen gas and excluding an oxygen-containing gas.

DESCRIPTIONS OF SIGNS AND NUMERALS

10 Substrate
20 Seed crystal substrate
21 GaN-crystal film

The invention claimed is:
1. A nitride crystal
in which a composition formula is represented by
$In_xAl_yGa_{1-x-y}N$ (satisfying $0 \leq x \leq 1$, $0 \leq y \leq 1$, $0 \leq x+y \leq 1$), and a concentration of B in the crystal is less than $1 \times 10^{15}$ at/cm$^3$, and
an in-plane distribution of each of the concentrations of O and C in a main surface of the crystal is less than $1 \times 10^{15}$ at/cm$^3$ in a region of 60% or more of the main surface of the crystal, wherein the main surface of the crystal is +c-plane of the nitride crystal.
2. The nitride crystal according to claim 1, wherein each of the concentrations of Si and Fe in the crystal is less than $1 \times 10^{15}$ at/cm$^3$.
3. The nitride crystal according to claim 2, wherein electric resistivity is $1 \times 10^6$ Ωcm or more under a temperature condition of 20° C. or more and 300° C. or less.
4. The nitride crystal according to claim 2, wherein electric resistivity is $1 \times 10^2$ Ωcm or less under a temperature condition of 20° C. or more and 300° C. or less.
5. The nitride crystal according to claim 1, wherein the concentration of Si is less than $1 \times 10^{15}$ at/cm$^3$ and the concentration of Fe is $1 \times 10^{16}$ at/cm$^3$ or more.
6. The nitride crystal according to claim 5, wherein electric resistivity is $1 \times 10^7$ Ω cm or more under a temperature condition of 20° C. or more and 300° C. or less.
7. The nitride crystal according to claim 1, wherein the concentration of Fe is less than $1 \times 10^{15}$ at/cm$^3$ and the concentration of Si or Ge or the total concentration of Si and Ge is $1 \times 10^{15}$ at/cm$^3$ or more in the crystal.
8. The nitride crystal according to claim 7, wherein electric resistivity is $1 \times 10^2$ Ωcm or less under a temperature condition of 20° C. or more and 300° C. or less.
9. The nitride crystal according to claim 7, wherein the concentration of Mg in the crystal is $1 \times 10^{17}$ at/cm$^3$ or more.
10. The nitride crystal according to claim 9,
wherein electric resistivity is $1 \times 10^2$ Ωcm or less under a temperature condition of 20° C. or more and 300° C. or less.
11. The nitride crystal according to claim 1,
wherein each of the concentrations of O and C in the crystal is less than $5 \times 10^{14}$ at/cm$^3$ in a region of 60% or more of the main surface of the crystal.
12. The nitride crystal according to claim 1,
wherein the concentration of O in the crystal is less than $5 \times 10^{14}$ at/cm$^3$ in a region of 60% or more of the main surface of the crystal, and
the concentration of C in the crystal is less than $1 \times 10^{14}$ at/cm$^3$ in a region of 60% or more of the main surface of the crystal.

* * * * *